United States Patent
Sohi et al.

(10) Patent No.: US 9,740,472 B1
(45) Date of Patent: *Aug. 22, 2017

(54) MECHANISM FOR PERFORMING ROLLING UPGRADES IN A NETWORKED VIRTUALIZATION ENVIRONMENT

(71) Applicant: Nutanix, Inc., San Jose, CA (US)

(72) Inventors: Aroosh Sohi, Santa Clara, CA (US); Robert William Schwenz, Campbell, CA (US); Miao Cui, Sunnyvale, CA (US); Akshay Khole, Sunnyvale, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,466

(22) Filed: Dec. 29, 2014

Related U.S. Application Data

(63) Continuation-in-part of application No. 14/278,363, filed on May 15, 2014.

(51) Int. Cl.
| | |
|---|---|
| *G06F 9/44* | (2006.01) |
| *G06F 9/445* | (2006.01) |
| *G06F 9/455* | (2006.01) |
| *G06F 15/173* | (2006.01) |

(52) U.S. Cl.
CPC ............ *G06F 8/65* (2013.01); *G06F 9/45533* (2013.01); *G06F 9/455* (2013.01); *G06F 15/173* (2013.01); *G06F 2009/4557* (2013.01)

(58) Field of Classification Search
CPC ........... G06F 8/65; G06F 9/455; G06F 15/173
USPC ................................................. 717/168–178
See application file for complete search history.

(56) References Cited

U.S. PATENT DOCUMENTS

| | | | |
|---|---|---|---|
| 5,253,252 A * | 10/1993 | Tobol ............................ | 370/452 |
| 5,884,308 A * | 3/1999 | Foulston | |
| 6,363,416 B1 * | 3/2002 | Naeimi et al. ................ | 709/209 |
| 6,684,397 B1 * | 1/2004 | Byer et al. ..................... | 717/174 |
| 6,738,801 B1 * | 5/2004 | Kawaguchi et al. ......... | 709/208 |
| 6,928,589 B1 * | 8/2005 | Pomaranski et al. ........ | 714/47.2 |
| 7,379,419 B2 * | 5/2008 | Collins ......................... | 370/217 |
| 7,421,578 B1 | 9/2008 | Huang et al. | |
| 7,461,374 B1 * | 12/2008 | Balint et al. .................. | 717/174 |
| 7,720,864 B1 * | 5/2010 | Muth et al. ................... | 707/785 |
| 7,934,117 B2 * | 4/2011 | Kakivaya et al. ............. | 714/4.1 |
| 7,937,455 B2 * | 5/2011 | Saha et al. .................... | 709/220 |

(Continued)

FOREIGN PATENT DOCUMENTS

WO    WO 2014200564 A1 * 12/2014

OTHER PUBLICATIONS

Kochut, Andrzej and Alexei Karve, "Leveraging Local Image Redundancy for Efficient Virtual Machine Provisioning," 2012 IEEE Network Operations and Management Symposium, Jun. 8, 2012, pp. 171-178.*

(Continued)

*Primary Examiner* — Wei Zhen
*Assistant Examiner* — Andrew M Lyons
(74) *Attorney, Agent, or Firm* — Vista IP Law Group, LLP

(57) ABSTRACT

Disclosed is a mechanism for performing rolling updates in a networked virtualization environment for storage management. The approach is applicable to any resource in the system, including controller VMs, hypervisors, and storage devices. Integrated processing may be performed across multiple types of upgrades.

59 Claims, 13 Drawing Sheets

(56) References Cited

U.S. PATENT DOCUMENTS

| | | | |
|---|---|---|---|
| 7,990,962 B2* | 8/2011 | Chang et al. | 370/390 |
| 8,051,252 B2 | 11/2011 | Williams | |
| 8,051,262 B2* | 11/2011 | Ichikawa et al. | 711/162 |
| 8,392,680 B1* | 3/2013 | Natanzon | G06F 11/1469 |
| | | | 711/161 |
| 8,424,003 B2* | 4/2013 | Degenaro et al. | 718/101 |
| 8,473,775 B1 | 6/2013 | Helmick | |
| 8,479,056 B2* | 7/2013 | Andrews et al. | 714/47.1 |
| 8,522,243 B2* | 8/2013 | Ventroux et al. | 718/103 |
| 8,549,518 B1* | 10/2013 | Aron | G06F 9/45558 |
| | | | 718/1 |
| 8,601,471 B2* | 12/2013 | Beaty | G06F 9/45558 |
| | | | 718/1 |
| 8,601,473 B1 | 12/2013 | Aron et al. | |
| 8,850,130 B1 | 9/2014 | Aron et al. | |
| 8,898,668 B1* | 11/2014 | Costea | G06F 9/45558 |
| | | | 709/203 |
| 9,009,106 B1 | 4/2015 | Aron et al. | |
| 9,032,248 B1 | 5/2015 | Petty | |
| 9,286,344 B1 | 3/2016 | Bhardwaj et al. | |
| 9,389,887 B1* | 7/2016 | Aron | G06F 9/45533 |
| 2002/0133491 A1 | 9/2002 | Sim et al. | |
| 2005/0210461 A1* | 9/2005 | Srivastava | G06F 8/67 |
| | | | 717/170 |
| 2005/0268298 A1 | 12/2005 | Hunt et al. | |
| 2006/0174238 A1* | 8/2006 | Henseler et al. | 717/168 |
| 2006/0174243 A1* | 8/2006 | Brewer et al. | 717/174 |
| 2007/0234332 A1* | 10/2007 | Brundridge et al. | 717/168 |
| 2009/0113034 A1 | 4/2009 | Krishnappa et al. | |
| 2009/0144720 A1* | 6/2009 | Roush | G06F 8/65 |
| | | | 717/171 |
| 2010/0042869 A1* | 2/2010 | Szabo | G06F 8/67 |
| | | | 714/4.1 |
| 2010/0110150 A1* | 5/2010 | Xu | B41J 2/09 |
| | | | 347/77 |
| 2010/0162226 A1* | 6/2010 | Borissov | G06F 8/67 |
| | | | 717/173 |
| 2010/0262717 A1 | 10/2010 | Critchley | |
| 2010/0293541 A1* | 11/2010 | Pall et al. | 717/178 |
| 2011/0099266 A1* | 4/2011 | Calder et al. | 709/224 |
| 2011/0107135 A1* | 5/2011 | Andrews | G06F 8/67 |
| | | | 714/2 |
| 2011/0154317 A1* | 6/2011 | Madduri et al. | 717/174 |
| 2011/0173493 A1* | 7/2011 | Armstrong | G06F 11/2046 |
| | | | 714/4.12 |
| 2011/0184993 A1* | 7/2011 | Chawla | G06F 9/45533 |
| | | | 707/802 |
| 2011/0202917 A1* | 8/2011 | Laor | 718/1 |
| 2012/0078948 A1 | 3/2012 | Darcy | |
| 2012/0079474 A1* | 3/2012 | Gold et al. | 717/173 |
| 2012/0110150 A1* | 5/2012 | Kosuru et al. | 709/221 |
| 2012/0233608 A1 | 9/2012 | Toeroe | |
| 2012/0243795 A1* | 9/2012 | Head | H04N 19/507 |
| | | | 382/218 |
| 2012/0254342 A1 | 10/2012 | Evans | |
| 2012/0266231 A1 | 10/2012 | Spiers et al. | |
| 2012/0311557 A1* | 12/2012 | Resch | 717/171 |
| 2012/0317142 A1 | 12/2012 | Broecheler et al. | |
| 2013/0007741 A1* | 1/2013 | Britsch | G06F 9/4401 |
| | | | 718/1 |
| 2013/0036323 A1 | 2/2013 | Goose et al. | |
| 2013/0138995 A1 | 5/2013 | Sivaramakrishnan et al. | |
| 2013/0174246 A1 | 7/2013 | Schrecker et al. | |
| 2013/0219030 A1* | 8/2013 | Szabo | H04L 49/70 |
| | | | 709/221 |
| 2013/0227550 A1 | 8/2013 | Weinstein et al. | |
| 2013/0304694 A1 | 11/2013 | Barreto et al. | |
| 2013/0332771 A1 | 12/2013 | Salapura et al. | |
| 2014/0052877 A1 | 2/2014 | Mao | |
| 2014/0068612 A1 | 3/2014 | Torrey | |
| 2014/0101649 A1* | 4/2014 | Kamble et al. | 717/170 |
| 2014/0109172 A1 | 4/2014 | Barton et al. | |
| 2014/0196056 A1* | 7/2014 | Kottomtharayil et al. | 718/105 |
| 2014/0222953 A1* | 8/2014 | Karve | G06F 9/455 |
| | | | 709/217 |
| 2015/0244802 A1 | 8/2015 | Simoncelli | |
| 2015/0326531 A1 | 11/2015 | Cui et al. | |
| 2015/0347775 A1* | 12/2015 | Bie | G06F 21/6218 |
| | | | 707/782 |
| 2016/0203008 A1 | 7/2016 | Cui et al. | |
| 2016/0204977 A1 | 7/2016 | Cui et al. | |

OTHER PUBLICATIONS

Ajmani et al., "Scheduling and Simulation: How to Upgrade Distributed Systems," HotOS IX: The 9th Workshop on Hot Topics in Operating Systems, USENIX, 2003, pp. 43-48.*

Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.*

Soules et al.; "Metadata Efficiency in a Comprehensive Versioning File System", May 2002, CMU-CS-02-145, School of Computer Science, Carnegie Mellon University, Pittsburgh, PA 15213, 33 pages.*

Non-final Office Action dated Jul. 7, 2015 for related U.S. Appl. No. 14/278,363.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Citrix, "Citrix XenServer 6.0 Administrator's Guide", Copyright 2012 Citrix Systems, Inc., 207 pages.

John L Hufferd, Hufferd Enterprises, SNIA, "IP Storage Protocols: iSCSI", Copyright 2011 Storage Networking Industry Association, 46 pages.

VMware, Technical White Paper, "Multipathing Configuration for Software iSCSI Using Port Binding", Copyright 2012 Vmware, Inc., 15 pages.

Non-final Office Action dated Oct. 7, 2016 for related U.S. Appl. No. 14/278,363.

Notice of Allowance and Fee(s) due dated Oct. 24, 2016 for related U.S. Appl. No. 14/206,869.

Non-final Office Action dated Nov. 1, 2016 for related U.S. Appl. No. 14/708,091.

Final Office Action dated Mar. 23, 2016 for related U.S. Appl. No. 14/278,363.

Notice of Allowance and Fee(s) due dated Jul. 19, 2016 for related U.S. Appl. No. 14/206,869.

U.S. Appl. No. 13/564,511, filed Aug. 1, 2012, 82 pages.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

International Search Report and Written Opinion dated Aug. 7, 2015, for corresponding PCT Patent Application No. PCT/US2015/030026, 10 pages.

Non-final Office Action dated Jul. 17, 2015 for related U.S. Appl. No. 14/206,869.

PCT International Search Report and Written Opinion dated Jun. 15, 2015 for related PCT Patent Application No. PCT/US2015/020139.

Final Office Action dated Jan. 25, 2016 for related U.S. Appl. No. 14/206,869.

Notice of Allowance and Fee(s) due dated Apr. 10, 2017 for related U.S. Appl. No. 14/278,363.

Final Office Action dated Apr. 20, 2017 for related U.S. Appl. No. 14/708,091.

Notice of Allowance and Fee(s) due dated May 15, 2017 for related U.S. Appl. No. 15/069,961.

(56) References Cited

OTHER PUBLICATIONS

Non-Final Office Action dated Jan. 26, 2017 for related U.S. Appl. No. 15/069,961.

* cited by examiner

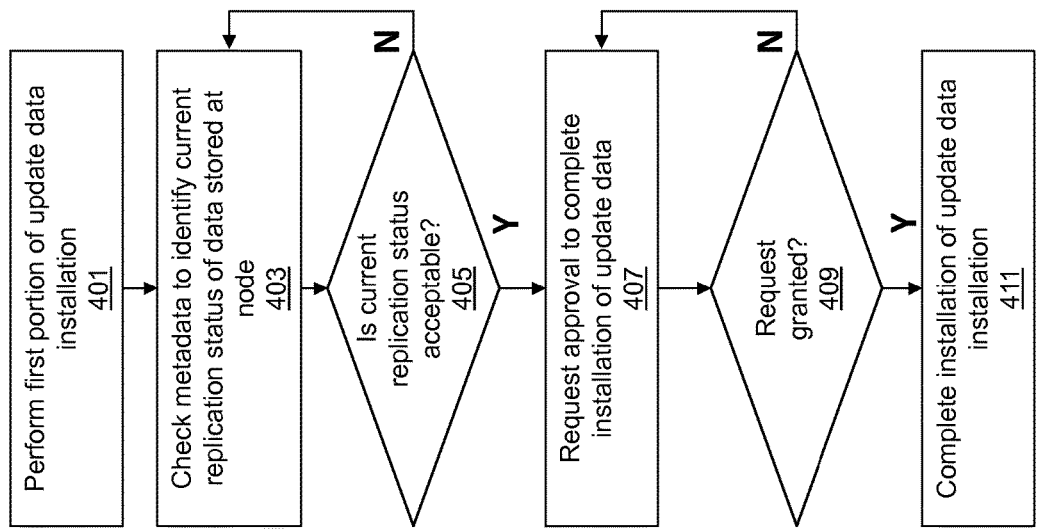

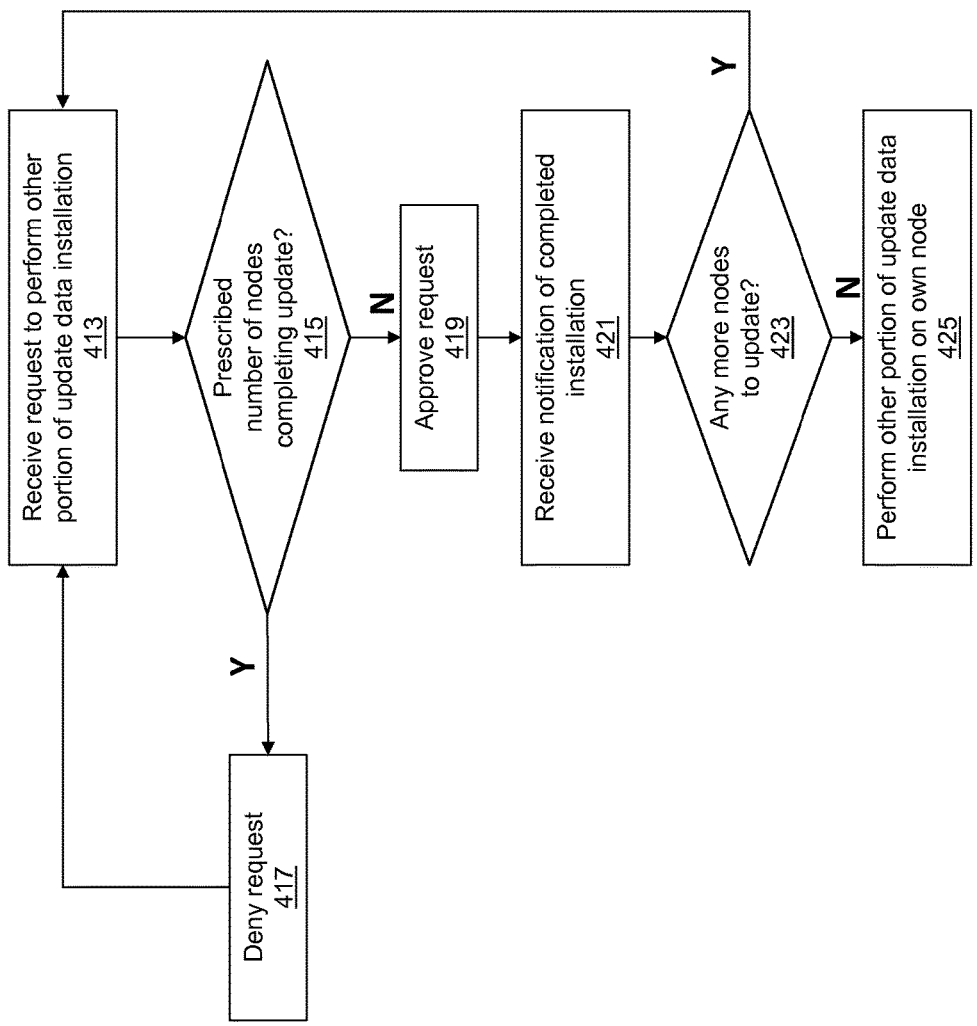

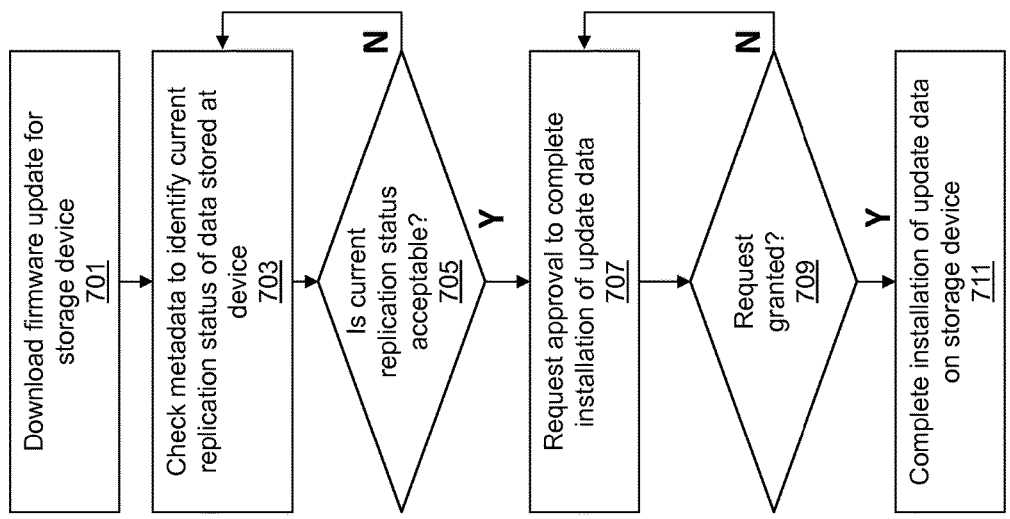

MECHANISM FOR PERFORMING ROLLING UPDATES IN A NETWORKED VIRTUALIZATION ENVIRONMENT

CROSS REFERENCE TO RELATED APPLICATIONS

The present application is a Continuation-In-Part of U.S. application Ser. No. 14/278,363, filed on May 15, 2014, entitled "MECHANISM FOR PERFORMING ROLLING UPDATES WITH DATA UNAVAILABILITY CHECK IN A NETWORKED VIRTUALIZATION ENVIRONMENT FOR STORAGE MANAGEMENT", which is hereby incorporated by reference in its entirety. The present application is also related to U.S. Pat. No. 8,601,473, entitled "ARCHITECTURE FOR MANAGING I/O AND STORAGE FOR A VIRTUALIZATION ENVIRONMENT", U.S. Pat. No. 8,850,130, entitled "METADATA FOR MANAGING I/O AND STORAGE FOR A VIRTUALIZATION ENVIRONMENT", U.S. Pat. No. 8,549,518, entitled "METHOD AND SYSTEM FOR IMPLEMENTING A MAINTENANCE SERVICE FOR MANAGING I/O AND STORAGE FOR A VIRTUALIZATION ENVIRONMENT", which are all hereby incorporated by reference in their entirety.

FIELD

This disclosure concerns a mechanism for performing rolling updates in a networked virtualization environment.

BACKGROUND

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Each node may host several user virtual machines, and virtual disks may be exposed by a node to its corresponding user virtual machines. In order to provide optimal storage management functionality to user virtual machines running within the networked virtualization environment, updates may be performed periodically at the nodes of the networked virtualization environment to ensure that the most current version of storage management functionality is available to the user virtual machines. To complete an update for a node in the networked virtualization environment, the node must be shut down or restarted for a period of time, where data residing at the node is unavailable during that portion of the update process. For the networked virtualization environment for storage management to continue operating without error, it must be ensured that data that is unavailable at a node currently undergoing an update process may be accessed at some other location within the networked virtualization environment.

Such updates may also be necessary for other components of the system. For example, the hypervisor that underpins the virtualization system may need to install updates. To complete an upgrade of the hypervisor, the node must be shut down or restarted for a period of time, where that node becomes unavailable during that portion of the update process. As another example, the firmware of storage devices at a node may also undergo an upgrade, where updated firmware is installed to that storage device. During the upgrade process, the storage device will be taken offline and remain unavailable until it has been brought back up again after the upgrade process is complete. Despite the fact that these nodes/devices may be unavailable during the upgrade time period, it is still necessary to undergo the upgrade process since the updates to be installed may relate to necessary bug fixes, installation of required security updates, or the like. However, the goal is to minimize the severity of the impact upon the overall system due to the upgrade process.

Therefore, what is needed is a mechanism for performing a rolling update in a networked virtualization environment for storage management that optimizes resource availability while minimizing data loss and service loss.

SUMMARY

Embodiments of the present invention provide a mechanism for performing rolling updates in a networked virtualization environment for storage management. The approach according to some embodiments is applicable to any resource in the system, including controller VMs, hypervisors, and storage devices. Integrated processing may be performed across multiple types of upgrades.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 4A is a flow diagram illustrating a method for completing installation of update data at a node in the networked virtualization environment from the perspective of a requesting update module.

FIG. 4B is a flow diagram illustrating a method for completing installation of update data at a node in the networked virtualization environment from the perspective of a master update module.

FIG. 7A is a flow diagram illustrating a method for upgrading a storage device.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

Embodiments of the present invention provide a mechanism for performing rolling updates in a networked virtualization environment for storage management. The approach according to some embodiments is applicable to any resource in the system, including controller VMs, hypervisors, and storage devices. Integrated processing may be performed across multiple types of upgrades.

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Figure 1:
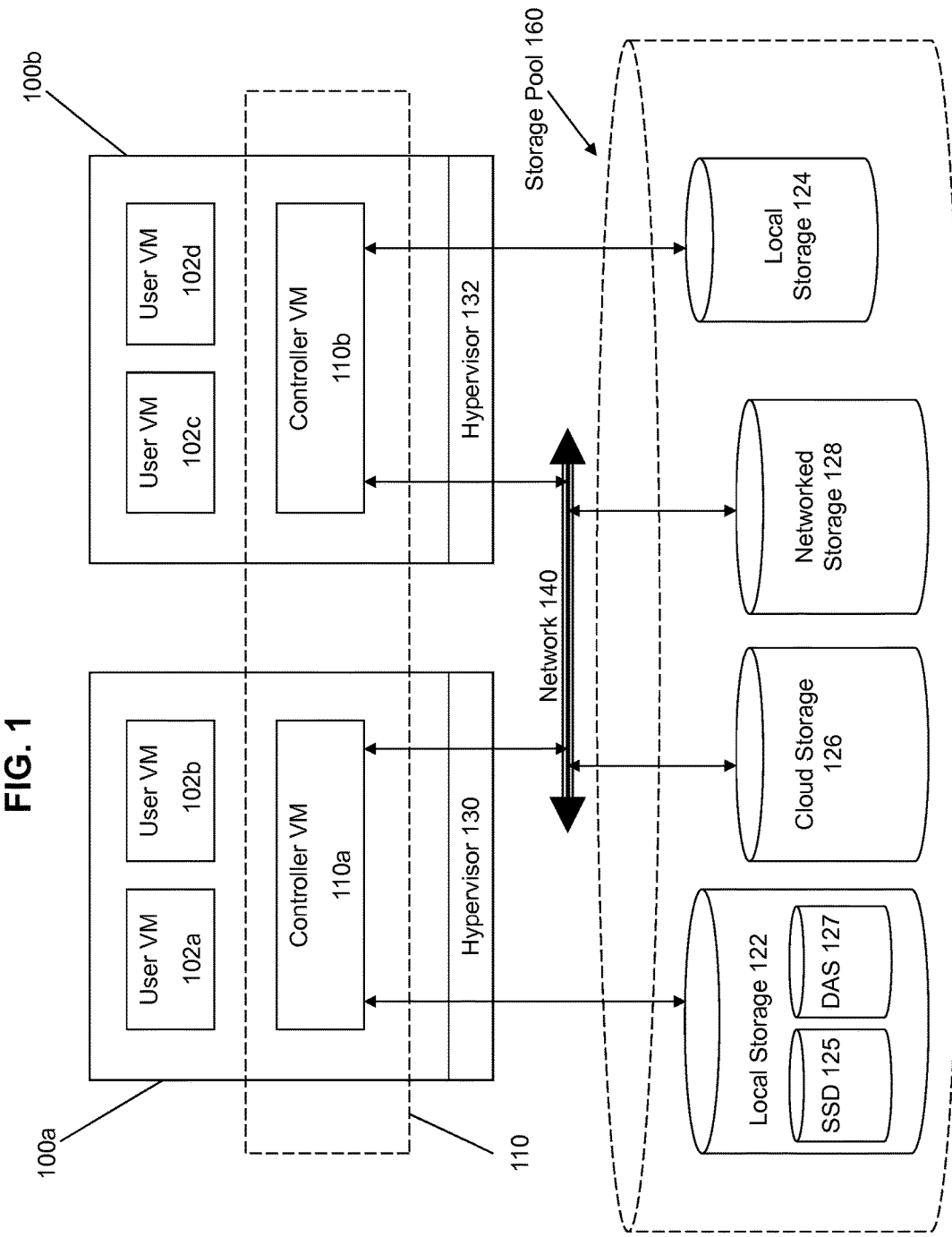
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in U.S. Pat. No. 8,601,473, entitled "ARCHITECTURE FOR MANAGING I/O AND STORAGE FOR A VIRTUALIZATION ENVIRONMENT", which is hereby incorporated by reference in its entirety.

As mentioned above, each node may host several user virtual machines, and virtual disks may be exposed by a node to its corresponding user virtual machines. In order to provide optimal storage management functionality to user virtual machines running within the networked virtualization environment, updates may be performed periodically at the nodes of the networked virtualization environment to ensure that the most current version of storage management functionality is available to the user virtual machines. To complete an update for a node in the networked virtualization environment, the node must be shut down or restarted for a period of time, where data residing at the node is unavailable during that portion of the update process. For the networked virtualization environment for storage management to continue operating without error, it must be ensured that data that is unavailable at a node currently undergoing an update process may be accessed at some other location within the networked virtualization environment.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will includes its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
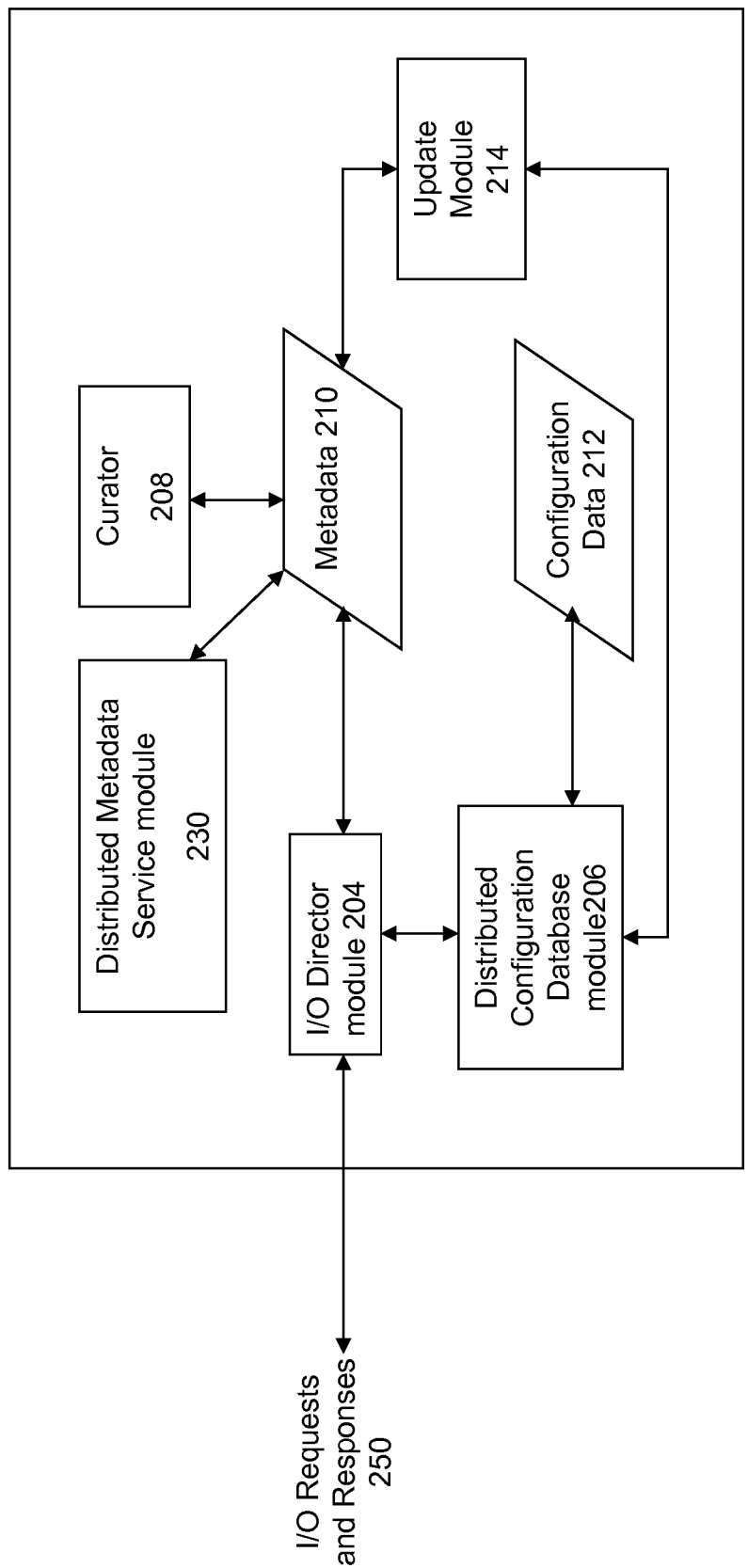
FIG. 2 illustrates the components of a Controller VM according to some embodiments of the invention.

In addition to handling storage tasks for the networked virtualization environment, the Controller VMs residing at each node may also be utilized to implement the mechanism for performing rolling updates with data unavailability check. FIG. 2 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 204 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the Controller VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Controller VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Controller VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in co-pending U.S. Pat. No. 8,850,130, entitled "METADATA FOR MANAGING I/O AND STORAGE FOR A VIRTUALIZATION" which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in U.S. Pat. No. 8,549,518, entitled, "METHOD AND SYSTEM FOR IMPLEMENTING A MAINTENANCE SERVICE FOR MANAGING I/O AND STORAGE FOR A VIRTUALIZATION ENVIRONMENT", which is hereby incorporated by reference in its entirety.

Some of the Controller VMs also includes a Distributed Configuration Database module 206 to handle certain administrative tasks. The primary tasks performed by the Distributed Configuration Database module 206 are to maintain configuration data 212 for the Controller VM and act as a notification service for all events in the distributed system. Examples of configuration data 212 include, for example, (1) the identity and existence of vDisks; (2) the identity of Controller VMs in the system; (3) the physical nodes in the system; (4) the physical storage devices in the system; and (5) information pertaining to updates and updates available for the system.

For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would be handled by the Distributed Configuration Database module 206 to update the configuration data 212 so that other entities in the system can be made aware of these configuration changes. As another example, whenever an update is available for the system, the Distributed Configuration Database module 206 would be informed of the update, after which the configuration data 212 is updated to reflect this information so that all other entities in the system can then be made aware of the existence of the update.

Another task that is handled by the Distributed Configuration Database module 306 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 306 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiment so the invention. According to some embodiments of the invention, the Distributed Configuration Database module 306 may be implemented on an SSD storage because of the real-time guarantees required to monitor health events.

Each Controller VM may also include an update module 214 for facilitating the performance of rolling updates to the networked virtualization environment. In some embodiments, the update module 214 is a highly available, fault-tolerant distributed service that runs on all the Controller VMs in the appliance. The update module 214 may be tasked with the responsibility of notifying the system of an update, identifying the existence of a update data, performing the installation of the update data, and also performing a data unavailability check to ensure that data for the networked virtualization environment is available during the rolling update, all of which will be discussed in greater detail below.

In order to facilitate the update module 214 in performing its set of duties, the update module 214 is provided access to the metadata 210 as well as configuration data 212. As illustrated in FIG. 2, the update module 214 is provided direct access to metadata 210 and is provided indirect access to the configuration data 212 through the distributed configuration database module 206. However, it is important to note, that the update module 214 may also be provided indirect access to the metadata 210 through other modules in the controller VM (e.g., distributed metadata service module 230). Likewise, the update module 214 may be provided direct access to the configuration data 212.

Figure 3:
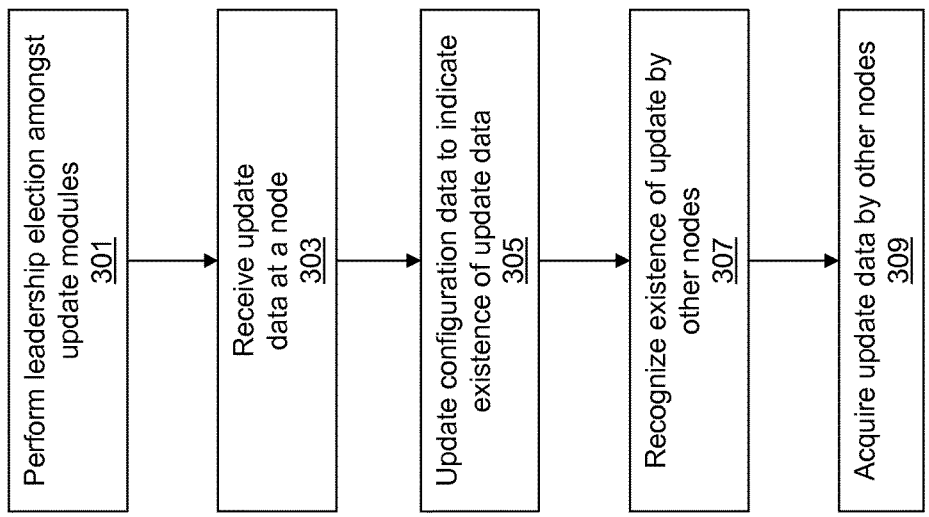
FIG. 3 is a flow diagram illustrating a method for acquiring update data for a rolling update of the networked virtualization environment for storage management.

FIG. 3 is a flow diagram illustrating a method for acquiring update data for a rolling update of the networked virtualization environment for storage management. The method described in FIG. 3 illustrates only a portion of the process for performing a rolling update of the networked virtualization environment, namely the process of performing a leadership election amongst the update modules and the process of acquiring update data by all of the nodes in the networked virtualization environment.

Initially, a leadership election is performed amongst all of the update modules in the networked virtualization environment as shown at 301. During the leadership election, a master update module is elected. The remaining update modules in the system act as slave update modules. The master update module is responsible for managing the completion of update data installation for all other update modules in the networked virtualization environment. In some embodiments, the master update module may maintain one or more tokens, which it may provide to other update modules in the networked virtualization environment to allow for those update modules to complete installation of update version data for its corresponding node, which will be described in greater detail below. This ensures that only a prescribed number of nodes within the networked virtualization environment are being shut down or restarted at a given time.

In some embodiments, the master update module may also be responsible for performing data unavailability checks on nodes requesting to complete installation of update version data. In such circumstances, before the master update module grants a request for a slave update module to complete installation of update version data for its corresponding node, the master update module checks to see if the networked virtualization environment is capable of tolerating unavailability of data at the corresponding node during completion of the installation, which will be described in greater detail below.

Leadership election may take place at various different points in time. For example, leadership election may take place upon initialization of the networked virtualization environment for storage management, upon the addition/deletion of a node, or upon the failure or unavailability of a node.

For purposes of example, we will assume that the leadership election process takes place amongst the update modules in the networked virtualization environment for storage management prior to the receipt of update data and the start of the rolling update.

A node within the networked virtualization environment for storage management then receives update data as shown at 303. An administrator of the networked virtualization environment may provide the update data to the node. The update data may include updates, patches, or additional features for improving the storage management functionality provided to user VMs in the networked virtualization environment for storage management.

The node to which the update data is provided may be any node within the networked virtualization environment, and need not be the node at which the master update module resides. The update module of the controller VM for the node may receive the update data.

Upon receiving the update data, the update module for the node stores the update data at a storage device local to the node (e.g., SSD). The update module then updates the configuration data to indicate the existence of update data as shown at 305. Where the update module has direct access to the configuration data, the update module may directly update the configuration data to indicate the existence of update data. Where the update module has indirect access to the configuration data, the update module may update the configuration data to indicate the existence of update data through the distributed configuration database module.

Because the distributed configuration database modules residing at each node within the networked virtualization environment are in communication with each other, all of the remaining distributed configuration database modules in the networked virtualization environment also update their copies of the configuration data to indicate the existence of update data. An update module for each node may then recognize the existence of update data as shown at 307. The update module at each node may recognize the existence of update data by accessing its configuration data either directly or through its corresponding distributed configuration database module.

Once an update module at a node in the networked virtualization environment recognizes the existence of a update data, it acquires the update data as shown at 309. In some embodiments, the update module may simply consult the configuration data to identify the location of the update data. In other embodiments, an update module may iterate through other nodes in the networked virtualization environment until it locates the update data. Once the update module has located the update data, it may acquire a copy of the update data from the located node and store a copy of the update data locally.

After all of the nodes in the networked virtualization environment have acquired a copy of the update data, a rolling update of the networked virtualization environment may begin. Installation of the update data may be performed in two steps. The first installation step may be performed without requiring the node to shut down or restart. The second installation step requires the node to shut down or restart, potentially resulting in unavailability of data residing at that node during the installation step. Thus, it is important to ensure that all data within the networked virtualization environment for storage management is available during the rolling update.

FIG. 4A is a flow diagram illustrating a method for completing installation of update data at a node in the networked virtualization environment. FIG. 4A begins after the steps of FIG. 3 have been performed (e.g., node has local copy of update version data). FIG. 4A will describe the process for completing installation of update data for nodes where a slave update module resides. The node at which the master update module resides will complete installation of the update data after the nodes at which slave update modules reside have completed installation of the update data, which will be described in additional detail below.

The method for completing installation of update data at a node in the networked virtualization environment described in FIG. 4A will be described from the perspective of the update module residing at the node.

Initially the node performs a first portion of its update data installation as shown at 401. The update module of the controller VM for the node may perform this portion of the installation process. The first portion of the installation process performed at the node includes any portion of the installation process that does not require the node to shut down or be restarted. All nodes (including the node at which the master update module resides) in the networked virtualization environment for storage management may perform this portion of the installation process in parallel. Because this portion of the installation process does not require node shutdown or restart, it may be performed without first being granted approval by the master update module.

After performing the first portion of the update version data installation that does not require shut down or restart, the update module checks one or more storage-related factors to see if the next portion of the update process can be completed, e.g., by checking the metadata to identify the current replication status of data stored at the node as shown at 403. Because the metadata includes information for tracking and maintaining contents of the vDisks and vDisks blocks for the networked virtualization environment for storage management, the update module may identify the current replication status for data stored at its corresponding node by consulting the metadata.

The current replication status for data refers to the current number of copies of that data that is available within the networked virtualization environment. A piece of data stored at a node may have several copies residing at other nodes in order to facilitate disaster recovery and node failures. Each piece of data within the networked virtualization environment may be associated with a desired replication factor (e.g., a desired number of copies), in order to guard against potential data unavailability due to node failure.

Once the update module has identified the current replication status of data stored at its node, it makes a determination as to whether the current replications status is acceptable as shown at 405.

In making such a determination, the update module may first identify whether any piece of data residing locally at its corresponding node has a current replication factor that falls below the desired replication factor. For example, if the desired replication factor for data in the system is 3 (e.g., 3 copies), then the update module may identify whether any pieces of data have a current replication factor of 2 or less. In some embodiments, if the current replication factor of any piece of data residing at the node falls below the desired replication factor, then the update module may determine that the current replication status is unacceptable.

The update module may also optionally identify whether failure of the node is supportable even where pieces of data having a current replication factor less than the desired replication factor exist. For example, where a piece of data with the lowest current replication factor that is local to the node has a current replication factor of 2, the update module may determine that failure of the node is supportable because at least another copy of the piece of data will exist at another node. Here, the update module may conclude that the current replication status is acceptable even though a piece of data local to the node having the lowest current replication factor falls below the desired replication factor because at least one other copy of the piece of data exists elsewhere in the networked virtualization environment.

If the update module determines that the current replication status is unacceptable, the method returns to 403, where metadata is again checked to identify the current replication status of data stored at the node. This process continues until the update module determines that the current replication status of data stored at its corresponding node is acceptable.

If the update module determines that the current replication status is acceptable, then the update module requests approval to complete installation of the update data as shown at 407. The request is made for approval to perform the portion of the installation that requires the node to be shut down or restarted such that data local to the node may be unavailable during that portion of the installation process.

In requesting approval to complete installation of the update data, the requesting update module may attempt to acquire a token from the master update module for completing installation of the update data. The master update module may have one or more tokens which it grants to nodes within the networked virtualization environment for ensuring that only a prescribed number of nodes are being shut down or restarted at a time to complete the installation process. This is done to minimize or eliminate the possibility of data residing at a node undergoing restart/shutdown being unavailable.

If the master update module determines that it has one or more tokens available, it will grant the requesting update module the token. Otherwise, if the master update module determines that it does not have any tokens available, it will deny the requesting update modules request.

The requesting update module makes a determination as to whether its request to complete installation of the update data is granted as shown at 409.

If the request is denied, then the method returns to 407, where the update module again requests approval from the master update module to complete installation of the update data. This process continues until the update module receives approval to the complete installation of the update data from the master update module.

If the request is granted, then the requesting update module completes installation of the update data as shown at 411. Completing installation of the update data involves shutting down or restarting the node at which the requesting update module resides. Shut down or restarts of the node are permitted because the networked virtualization environment has already verified that copies of data local to the node reside elsewhere and are available while the node is down. After the update module completes installation of the update, it returns the token to the master update module such that other nodes in the system may be granted approval to complete installation of the update data.

FIG. 4B is a flow diagram illustrating a method for completing installation of update data for nodes in the networked virtualization environment from the perspective of the master update module. FIG. 4B begins after the steps of FIG. 3 have been performed (e.g., each node in the networked virtualization environment has a local copy of the update data) and illustrates the steps performed by the master update module in correspondence with the steps performed by the requesting update module in FIG. 4A.

Initially, the master update module receives a request for approval to complete installation of update data from a node in the networked virtualization environment as shown at 413. When the master update module receives a request, it first makes a determination as to whether a prescribed number of nodes in the networked virtualization environment are currently completing installation of the update data as shown at 415.

The master update module may make such a determination by simply identifying whether or not it has any tokens available. If the master update module determines that it has no tokens available, then the prescribed number of nodes in the networked virtualization environment currently completing installation of the update data has been met and the networked virtualization environment is unable to tolerate any additional nodes completing installation of the update data at the current time. If, instead the master update module determines that it has one or more tokens available, then the prescribed number of nodes in the networked virtualization environment currently completing installation of the update data has not yet been met and the networked virtualization environment is currently able to tolerate additional nodes completing installation of the update data.

Alternatively, where tokens are not used, the update module may consult its metadata or configuration data to identify the number of nodes in the networked virtualization environment currently completing installation of the update data and whether that number equals the prescribed number or falls below the prescribed number.

When the number of nodes in the networked virtualization environment currently completing installation of the update data equals the prescribed number, the networked virtualization environment is unable to tolerate any additional nodes completing installation of the update data at the current time and the master update module denies the requesting node's request as shown at 417. The master update module then returns to 413 where it waits to receive another request from a node to complete installation of update data.

When the number of nodes in the networked virtualization environment currently completing installation of the update data falls below the prescribed number, the networked virtualization environment is able to currently tolerate the requesting node completing installation of the update data and the master update module may approve the request as shown at 419.

In FIG. 4B, the master update module is not tasked with the responsibility of determining whether the current replication status of the requesting node is acceptable. Rather, it is the slave update module at the requesting node that is tasked with this responsibility, and only after the slave update module has determined that its current replications status is acceptable will it request to complete installation of update data. Thus, the master update module may simply grant approval to the requesting node upon determining that the number of nodes in the networked virtualization environment currently completing installation of the update data falls below the prescribed number.

After granting approval to the requesting node, the master update module waits to receive a notification of the completion of installation of the update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 421, the master update module determines whether or not any additional nodes in the networked virtualization environment need to complete installation of update data as shown at 423. The master update module may determine whether or not any additional nodes other than its own corresponding node need to complete installation of the update data.

If the master update module determines that there are additional nodes that need to complete installation of the update data, then it returns to 413, where it waits to receive another request to complete installation for update data from another node.

If the master update module instead determines that there are no additional nodes that need to complete installation of the update data, then it completes installation of update data at its own node as shown at 425. In order for the master update module to complete installation of the update data at its own node, there must be another leadership election to elect a new master update module.

In alternative embodiments, the master update module may complete installation of the update data at its own node at any time. When the master update module completes installation of update data at its own node another leadership election is performed to elect a new master update module.

FIGS. 4A and 4B illustrate an embodiment where the update module of the node requesting approval to complete installation of the update version data performs the replication status check (e.g., data unavailability check). However, in other embodiments, the master update module may perform the replication status check (e.g., data unavailability check) rather than the requesting update module.

Figure 5A:
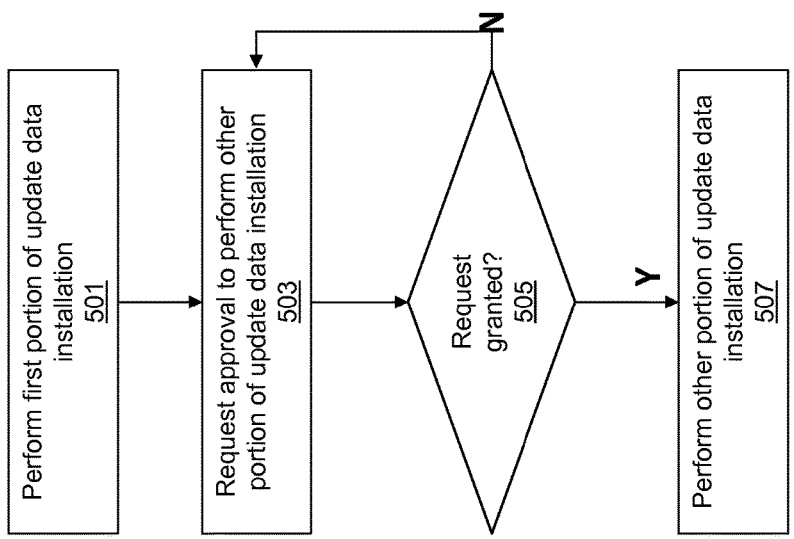
FIG. 5A is a flow diagram illustrating an alternative method for completing installation of update data at a node in the networked virtualization environment from the perspective of a requesting update module.

FIG. 5A is a flow diagram illustrating a method for completing installation of update data at a node in the networked virtualization environment. FIG. 5A illustrates the method for completing installation of update data where the master update module is tasked with the responsibility of determining whether the requesting node has an acceptable current replication status.

FIG. 5A also begins after the steps of FIG. 3 have been performed (e.g., node has local copy of update version data). Similarly, FIG. 5A will describe the process for completing installation of update data for nodes where a slave update module resides. The node at which the master update module resides completes installation of the update data after the nodes at which slave update modules reside have completed installation of the update data, which will be described in additional detail below.

The method for completing installation of update data at a node in the networked virtualization environment described in FIG. 5A will be described from the perspective of the update module residing at the node.

Initially the node performs a first portion of its update data installation as shown at 501. The update module of the controller VM for the node may perform this portion of the installation process. The first portion of the installation process performed at the node includes any portion of the installation process that does not require the node to shut down or be restarted. All nodes (including the node at which the master update module resides) in the networked virtualization environment for storage management may perform this portion of the installation process in parallel. Because this portion of the installation process does not require node shutdown or restart, it may be performed without first being granted approval by the leader update module.

After performing the first portion of the update version data installation that does not require shut down or restart, the update module requests approval from the master update module to complete installation of the update data as shown at 503.

In requesting approval to complete installation of the update data, the requesting update module may attempt to acquire a token from the master update module for completing installation of the update data. The master update module may have one or more tokens which it grants to nodes within the networked virtualization environment for ensuring that only a prescribed number of nodes are being shut down or restarted at a time to complete the installation process. This is done to minimize or eliminate the possibility of data residing at a node undergoing restart/shutdown being unavailable.

The method of FIG. 5A differs from the method in FIG. 4A in that the master update module is tasked with the responsibility of determining the current replication status of the requesting node and the acceptability of the current replication status rather than the update module at the requesting node. Thus, when the master update module receives a request to complete installation of update data from a slave update module, the master update module makes several different determinations before granting or denying the request.

If the master update module determines that it does not have any tokens available, it will deny the requesting update modules request without determining whether or not the replication status of the requesting node is acceptable.

Otherwise, if the master update module determines that it has one or more tokens available, it will next determine whether or not the current replication status of the requesting node is acceptable.

The master update module may first check its metadata to identify the current replication status of data stored at the requesting node. Because the metadata includes information for tracking and maintaining contents of the vDisks and vDisks blocks for the entire networked virtualization environment for storage management, the master update module may identify the current replication status for data stored at the requesting node by consulting its metadata.

The current replication status for data refers to the current number of copies of that data that is available within the networked virtualization environment. A piece of data stored at a node may have several copies residing at other nodes in order to facilitate disaster recovery and node failures. Each piece of data within the networked virtualization environment may be associated with a desired replication factor (e.g., a desired number of copies), in order to guard against potential data unavailability due to node failure.

Once the master update module has identified the current replication status of data stored at the requesting node, it makes a determination as to whether the current replications status of the requesting node is acceptable.

In making such a determination, the master update module may first identify whether any piece of data residing locally at the requesting node has a current replication factor that falls below the desired replication factor. For example, if the desired replication factor for data in the system is 3 (e.g., 3 copies), then the master update module may identify whether any pieces of data at the requesting node have a current replication factor of 2 or less. In some embodiments, if the current replication factor of any piece of data residing at the requesting node falls below the desired replication factor, then the master update module may determine that the current replication status is unacceptable and deny approval for completing installation of the update data to the requesting node The master update module may also optionally identify whether failure of the requesting node is supportable even where pieces of data at the requesting node having a current replication factor less than the desired replication factor exist. For example, where a piece of data with the lowest current replication factor that is local to the requesting node has a current replication factor of 2, the master update module may determine that failure of the requesting node is supportable because at least another copy of the piece of data will exist at another node in the networked virtualization environment. Here, the master update module may conclude that the current replication status is acceptable even though a piece of data local to the requesting node having the lowest current replication factor falls below the desired replication factor because, at least one other copy of the piece of data exists elsewhere in the networked virtualization environment.

If the master update module determines that the current replication status of the requesting node is unacceptable, then approval for completing installation of the update data is denied.

If instead the master update module determines that the current replication status of the requesting node is acceptable, then approval for completing installation of the update data is approved.

The requesting update module makes a determination as to whether its request to complete installation of the update data is granted as shown at 505.

If the request is denied, then the method returns to 503, where the update module again requests approval from the master update module to complete installation of the update data. This process continues until the update module receives approval to the complete installation of the update data from the master update module.

If the request is granted, then the requesting update module completes installation of the update data as shown at 507. Completing installation of the update data involves shutting down or restarting the node at which the requesting update module resides. Shut down or restarts of the node are permitted because the networked virtualization environment has already verified that copies of data local to the node reside elsewhere and are available while the node is down. After the update module completes installation of the update, it returns the token to the master update module such that other nodes in the system may be granted approval to complete installation of the update data.

Figure 5B:
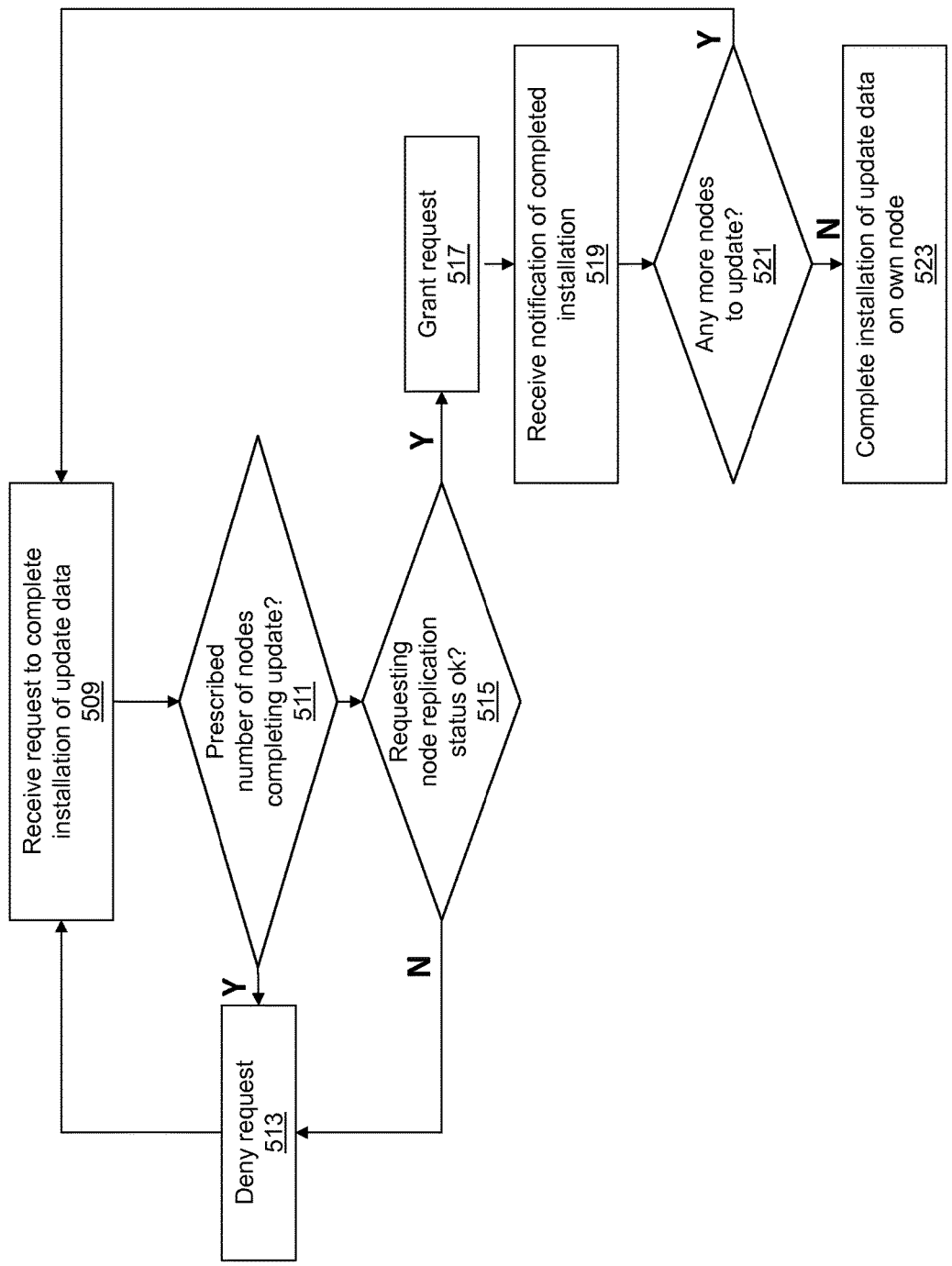
FIG. 5B is a flow diagram illustrating an alternative method for completing installation of update data at a node in the networked virtualization environment from the perspective of a master update module.

FIG. 5B is a flow diagram illustrating a method for completing installation of update data for nodes in the networked virtualization environment from the perspective of the master update module. FIG. 5B begins after the steps of FIG. 3 have been performed (e.g., each node in the networked virtualization environment has a local copy of the update data) and illustrates the steps performed by the master update module in correspondence with the steps performed by the requesting update module in FIG. 5A.

Initially, the master update module receives a request for approval to complete installation of update data from a node in the networked virtualization environment as shown at 509. When the master update module receives a request, it first makes a determination as to whether a prescribed number of nodes in the networked virtualization environment are currently completing installation of the update data as shown at 511.

The master update module may make such a determination by simply identifying whether or not it has any tokens available. If the master update module determines that it has no tokens available, then the prescribed number of nodes in the networked virtualization environment currently completing installation of the update data has been met and the networked virtualization environment is unable to tolerate any additional nodes completing installation of the update data at the current time. If, instead the master update module determines that it has one or more tokens available, then the prescribed number of nodes in the networked virtualization environment currently completing installation of the update data has not yet been met and the networked virtualization environment is currently able to tolerate additional nodes completing installation of the update data.

Alternatively, where tokens are not used, the update module may consult its metadata or configuration data to identify the number of nodes in the networked virtualization environment currently completing installation of the update data and whether that number equals the prescribed number or falls below the prescribed number.

When the number of nodes in the networked virtualization environment currently completing installation of the update data equals the prescribed number, the networked virtualization environment is unable to tolerate any additional nodes completing installation of the update data at the current time and the master update module denies the requesting node's request as shown at 513. The master update module then returns to 501 where it waits receives another request from a node to complete installation of update data.

When the number of nodes in the networked virtualization environment currently completing installation of the update data falls below the prescribed number, the networked virtualization environment is able to currently tolerate the requesting node completing installation of the update data.

After determining that the networked virtualization environment is able to currently tolerate the requesting node completing installation of the update data, the master update module may then determine whether the current replication status of the requesting node is acceptable as shown at 515.

The master update module may first check its metadata to identify the current replication status of data stored at the requesting node. Because the metadata includes information for tracking and maintaining contents of the vDisks and vDisks blocks for the entire networked virtualization environment for storage management, the master update module may identify the current replication status for data stored at the requesting node by consulting its metadata.

Once the master update module has identified the current replication status of data stored at the requesting node, it makes a determination as to whether the current replications status of the requesting node is acceptable.

In making such a determination, the master update module may first identify whether any piece of data residing locally at the requesting node has a current replication factor that falls below the desired replication factor. For example, if the desired replication factor for data in the system is 3 (e.g., 3 copies), then the master update module may identify whether any pieces of data at the requesting node have a current replication factor of 2 or less. In some embodiments, if the current replication factor of any piece of data residing at the requesting node falls below the desired replication factor, then the master update module may determine that the current replication status is unacceptable and deny approval for completing installation of the update data to the requesting node The master update module may also optionally identify whether failure of the requesting node is supportable even where pieces of data at the requesting node having a current replication factor less than the desired replication factor exist. For example, where a piece of data with the lowest current replication factor that is local to the requesting node has a current replication factor of 2, the master update module may determine that failure of the requesting node is supportable because at least another copy of the piece of data will exist at another node in the networked virtualization environment. Here, the master update module may conclude that the current replication status is acceptable even though a piece of data local to the requesting node having the lowest current replication factor falls below the desired replication factor because, at least one other copy of the piece of data exists elsewhere in the networked virtualization environment.

If the master update module determines that the current replication status of the requesting node is unacceptable, then approval for completing installation of the update data is denied as shown at 513, and the master update module returns to 509 where it waits to receive another request to complete installation of update data from a node in the networked virtualization environment.

If instead the master update module determines that the current replication status of the requesting node is acceptable, then approval for completing installation of the update data is granted as shown at 517.

After granting approval to the requesting node, the master update module waits to receive a notification of the completion of installation of the update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 519, the master update module determines whether or not any additional nodes in the networked virtualization environment need to complete installation of update data as shown at 521. The master update module may determine whether or not any additional nodes other than its own corresponding node need to complete installation of the update data.

If the master update module determines that there are additional nodes that need to complete installation of the update data, then it returns to 509, where it waits to receive another request to complete installation for update data from another node.

If the master update module instead determines that there are no additional nodes that need to complete installation of the update data, then it completes installation of update data at its own node as shown at 523. In order for the master update module to complete installation of the update data at its own node, there must be another leadership election to elect a new master update module.

Hypervisor Upgrades

The above-described approach is also applicable to perform upgrades of other types of resources or components in the computing environment. For example, in a virtualization environment, the hypervisor may also be subject to periodic data updates. To complete an upgrade of the hypervisor, the node must be shut down or restarted for a period of time, where that node becomes unavailable during that portion of the update process.

Using the techniques described above, a distributed management solution can be implemented to manage the upgrade process for hypervisors in embodiments of the invention. An election process is performed to identify a master update module to manage the upgrade process. This avoids the need to designate a fixed central controller for the upgrade process, which is very advantageous since a fixed central controller is subject to problems such as becoming a single point of failure or contention. Leadership election may take place at various different points in time. For example, leadership election may take place upon initialization of the networked virtualization environment for storage management, upon the addition/deletion of a node, or upon the failure or unavailability of a node.

The master update module is responsible for managing the upgrade process for all other update modules in the networked virtualization environment. The master update module may maintain one or more tokens that it provides to other update modules in the networked virtualization environment to allow those update modules to complete installation of updated hypervisor data for its corresponding node.

Figure 6A:
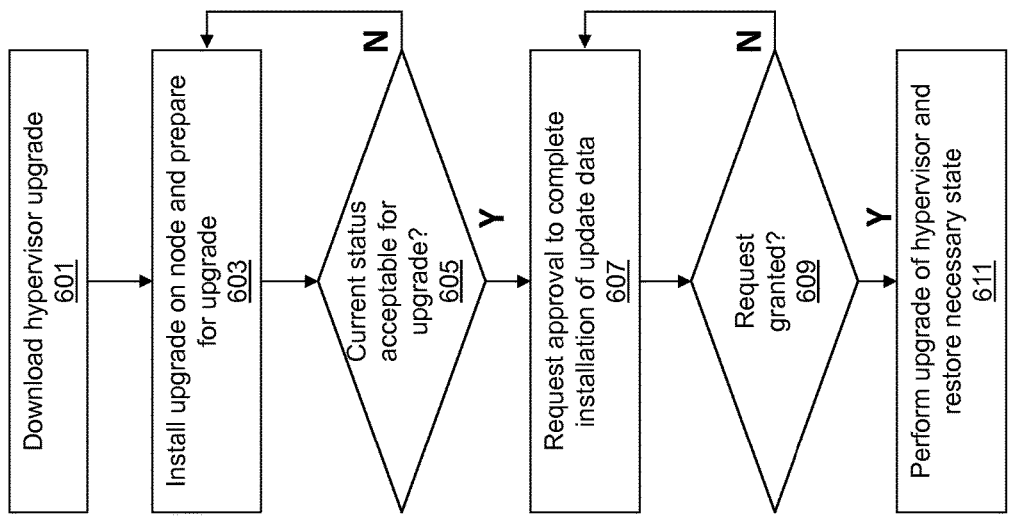
FIG. 6A is a flow diagram illustrating a method for upgrading a hypervisor in the networked virtualization environment from the perspective of a requesting update module.

FIG. 6A is a flow diagram illustrating a method for performing hypervisor upgrades at a node in the networked virtualization environment from the perspective of the updating node. At 601, the data updates for a hypervisor is downloaded to the respective nodes. Such update data may include updates, patches, or additional features to the hypervisor.

There may be many different types of hypervisors in the virtualization environment, e.g., Hyper-V, KVM, and ESX. Therefore, it is possible that there are different types of hypervisor data updates which need to be correctly downloaded to the appropriate node. For example, the update data for ESX hypervisors may take the form of an offline data bundle, the update data for Hyper-V hypervisors may take the form of ISO data, and the update data for KVM hypervisors may take the form of update scripts/programs.

One possible approach to address this issue is to have an administrator of the networked virtualization environment take on the task of providing the correct update data to specific nodes in the system. Another possible approach is to auto-detect the hypervisor type at a given node, and to then download the appropriate update data for that node based upon the identified hypervisor type.

The downloads of the data updates need not be performed in a serial process. In other words, some or all of the nodes can decide to download the update data in parallel. In some embodiments, the update module at a node simply consults a set of configuration data to identify the location of the update data. In other embodiments, an update module may iterate through other nodes in the networked virtualization environment until it locates the update data. Once the update module has located the update data, it may acquire a copy of the update data from the located node and store a copy of the update data locally.

After all of the nodes in the networked virtualization environment have acquired a copy of the update data, a rolling update of the hypervisors may begin. Upgrades to the hypervisors may be performed in two steps, where the first step is to install the update data and the second step is to actually perform the upgrade. In the present embodiment, there is deemed to be a terminology distinction between the act of "installing" the update data and the act of "upgrading" the node. Installation is performed to store the downloaded update data into an appropriate location in the appropriate format, and to make any preparations necessary for the impending upgrade. In contrast, upgrading involves the actual act of changing the currently running hypervisor with the old data and restarting the hypervisor with the new data. The first installation step may be performed without requiring the node to shut down or restart. The second installation step requires the node to shut down or restart, potentially resulting in unavailability of data or VMs at that node during the installation step.

At 603, the update data is installed on each node and preparations are made at this time to actually perform the upgrade. Upon downloading the update data, the update module for the node stores the update data at a storage device local to the node. The different types of hypervisors may cause the update data to be stored in a manner that corresponds to that hypervisor type. For example, for ESX hypervisors, the offline bundle data containing the update data may be placed into an alternative boot bank at the node. For hyper-V type hypervisors, the update data may be mounted as a virtual drive on the node. For KVM type hypervisors, the update data may be embodied as a script having appropriate upgrade commands, where the script is stored in a designated location on the node.

Preparations are also made at this point to perform the upgrade. Any VMs that are resident on the node will be migrated to other nodes. The hypervisor's built-in migration mechanism can be utilized to perform the migration of VMs.

One or more storage-related factors may also be checked to see if the next portion of the update process can be completed. For example, any item of data that needs to be replicated to another node to meet replication requirements can be replicated at this point. For example, assume that a given item of data on the node is required to be replicated on at least two nodes, and currently only one other node possesses a copy of that data item. In this situation, bringing down the node would cause the system to have only one available copy, which would be a violation of the replication requirements for the data item. In this situation, one possible preparation action is to replicate the data item to another node.

The state of the node and/or the CVM on the node can also be tracked and maintained at this point. These are placed into the appropriate form so that that can be reinstated after the hypervisor upgrade. For example, configuration parameters that need to be put into place after the upgrade can be maintained on the local disk so that they can be appropriately re-configured after the upgrade.

It is noted that these action are performed at the node and includes portions of the installation process that do not require the node to shut down or be restarted. All nodes (including the node at which the master update module resides) in the networked virtualization environment for storage management may perform these portions of the installation process in parallel. Because this portion of the installation process does not require node shutdown or restart, it may be performed without first being granted approval by the master update module.

The update module of the controller VM for the node may perform these above-described portions of the installation process, or it may call native functionality on the hypervisor as appropriate to perform these actions (such as the VMotion feature on certain systems implement VM migration).

A determination is made at 605 as to whether the current status of the node is acceptable for the upgrade. For example, the update module may check the appropriate metadata to identify the current replication status of data stored at the node, and to see if the current number of copies of that data that is available within the networked virtualization environment is acceptable. A check may also be made to see if all VMs that need to be migrated from the node has been migrated. An additional check can be made as to whether there have been any disk/device failures in the course of the upgrade process.

If the current status is unacceptable for upgrade, then the process returns back to 603 to take any actions that are necessary before upgrade can be performed. Alternatively, an exception can be issued, either immediately or after a designated time-out or retry period has elapsed.

If the update module determines that the current status is acceptable, then the update module at that node requests approval to perform the upgrade at 607. The request is made for approval to perform the portion of the installation that requires the node to be shut down or restarted such that the node itself, or any data local to the node, may be unavailable during that portion of the installation process.

In requesting approval to complete installation of the update data, the requesting update module may attempt to acquire a token from the master update module for completing installation of the update data. The master update module may have one or more tokens which it grants to nodes within the networked virtualization environment for ensuring that only a prescribed number of nodes are being shut down or restarted at a time to complete the hypervisor installation process. Only a limited number of tokens are available, to minimize or eliminate the possibility of an excessive number of nodes being unavailable or of data residing at a node undergoing restart/shutdown being unavailable.

If the master update module determines that it has one or more tokens available, it will grant the requesting update module the token. Otherwise, if the master update module determines that it does not have any tokens available, it will deny the requesting update modules request. The requesting update module makes a determination as to whether its request to complete installation of the update data is granted as shown at 609.

If the request is denied, then the method returns to 607, where the update module again requests approval from the master update module to complete installation of the update data. This process continues until the update module receives approval to the complete installation of the update data from the master update module.

If the request is granted, then the requesting update module completes installation of the update data as shown at 611. Completing installation of the update data may involve shutting down or restarting the node at which the requesting update module resides. For example, a complete reboot of the hypervisor may be performed, with the update data configured such that the hypervisor will reboot with the upgraded hypervisor data.

After the hypervisor has rebooted, the update module finalize the upgrade of the hypervisor. On the node itself, the upgrade may be finalized by migrating VMs and data items back to the node. In addition, any node-specific setting that need to be configured may also be performed after the hypervisor reboots back up. The update module may also return the token to the master update module such that other nodes in the system may be granted approval to complete installation of the update data.

In the interim, the distributed nature of the system ensures that services and data accesses will not be interrupted. For example, the other controller VMs in the system would be notified of the down-status of the controller VM on the upgraded node, and requests for the down controller VM will be auto-routed to the other controller VMs to handle any storage requests. Once the node comes back up, the distributed metadata for the system is updated to reflect this change in status, and those requests will once again be handled by the controller VM on that node.

Figure 6B:
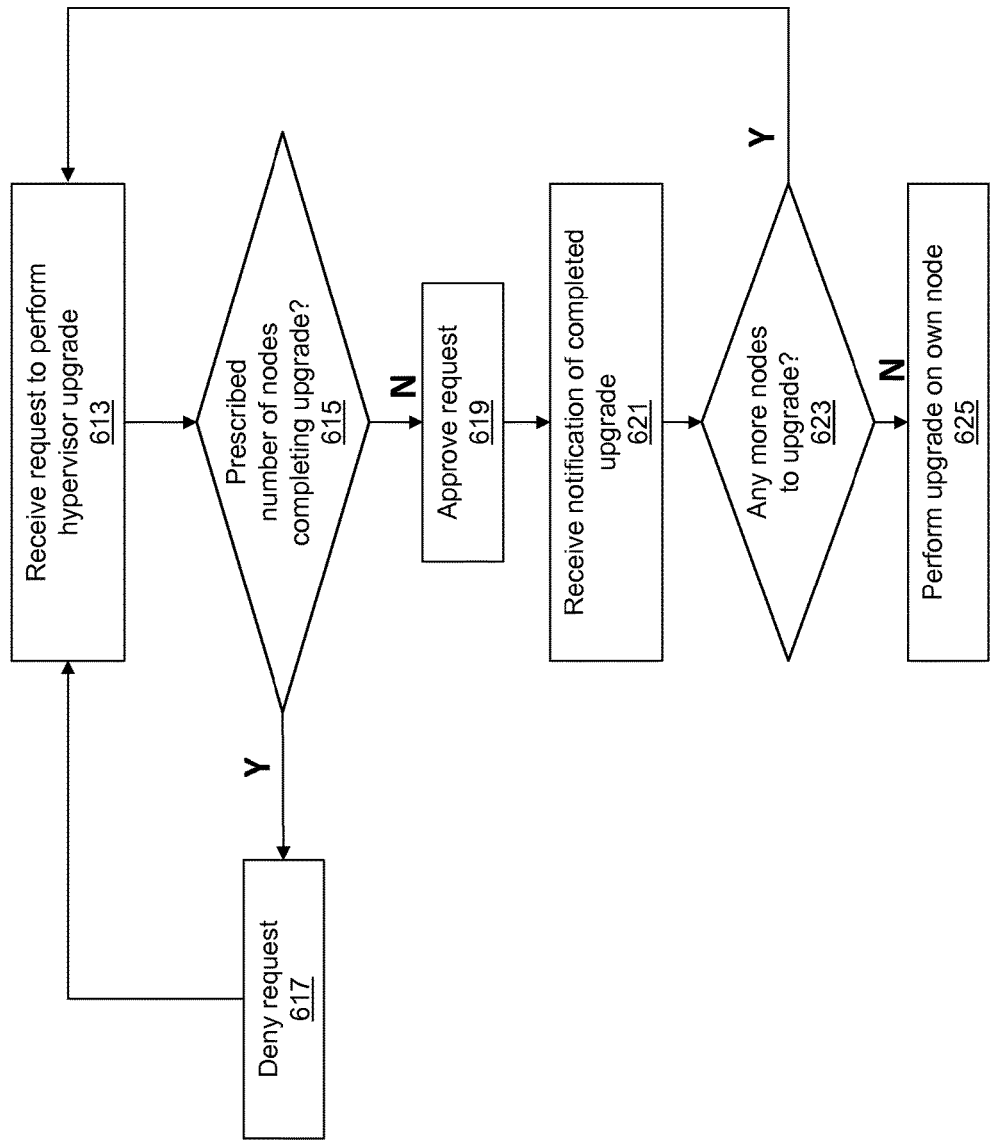
FIG. 6B is a flow diagram illustrating a method for upgrading a hypervisor in the networked virtualization environment from the perspective of a master update module.

FIG. 6B is a flow diagram illustrating a method for completing hypervisor upgrades for nodes in the networked virtualization environment from the perspective of the master update module. Initially, the master update module receives a request for approval to complete installation of update data from a node in the networked virtualization environment as shown at 613. When the master update module receives a request, it first makes a determination as to whether a prescribed number of nodes in the networked virtualization environment are currently completing installation of the update data as shown at 615.

The master update module may make such a determination by identifying whether or not it has any tokens available. If the master update module determines that it has no tokens available, then the prescribed number of nodes in the networked virtualization environment currently completing installation of the update hypervisor data has been met and the networked virtualization environment is unable to tolerate any additional nodes completing installation of the update data at the current time. If, instead the master update module determines that it has one or more tokens available, then the prescribed number of nodes in the networked virtualization environment currently completing installation of the update data has not yet been met and the networked virtualization environment is currently able to tolerate additional nodes completing installation of the update data. Alternatively, where tokens are not used, the update module may consult its metadata or configuration data to identify the number of nodes in the networked virtualization environment currently completing installation of the update data and whether that number equals the prescribed number or falls below the prescribed number.

When the number of nodes in the networked virtualization environment currently completing upgrades to hypervisors equals the prescribed number, the networked virtualization environment is unable to tolerate any additional nodes completing installation of the update hypervisor data at the current time and the master update module denies the requesting node's request as shown at 617. The master update module then returns to 413 where it waits to receive another request from a node to complete installation of update data.

However, when the number of nodes in the networked virtualization environment currently completing installation of the update data falls below the prescribed number, the networked virtualization environment is able to currently tolerate the requesting node completing installation of the update data and the master update module may approve the request as shown at 619.

After granting approval to the requesting node, the master update module waits to receive a notification of the completion of installation of the hypervisor update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 621, the master update module determines whether or not any additional nodes in the networked virtualization environment need to complete installation of update data as shown at 4623. The master update module may determine whether or not any additional nodes other than its own corresponding node need to complete installation of the update data. If the master update module determines that there are additional nodes that need to complete installation of the update data, then it returns to 613, where it waits to receive another request to complete installation for update data from another node.

If the master update module instead determines that there are no additional nodes that need to complete installation of the update data, then it completes installation of update data at its own node as shown at 625. In order for the master update module to complete installation of the update data at its own node, there must be another leadership election to elect a new master update module.

In this approach, the master update module is not tasked with the responsibility of checking upon storage-related factors to see if the next stage of the update process can be completed, e.g., by determining whether the current replication status of the requesting node is acceptable. Instead, the slave update modules at the requesting nodes are tasked with this responsibility, and only after the slave update module has determined that its current replications status is acceptable will it request to complete installation of update data. Thus, the master update module may simply grant approval to the requesting node upon determining that the number of nodes in the networked virtualization environment currently completing installation of the update data falls below the prescribed number. In alternative embodiments, the master update module may complete installation of the update data at its own node at any time. When the master update module completes installation of update data at its own node another leadership election is performed to elect a new master update module.

Storage Device Upgrades

As noted above, the inventive concepts disclosed herein are applicable to perform upgrades of any appropriate type of resources or components in the computing environment. Storage devices may also be subject to periodic updates, particularly to the firmware used to operate the storage device. For example, the firmware on SSDs may undergo frequent upgrades address bug fixes and to correct security issues. Similar firmware updates may also need to be implemented for HDDs. To complete an upgrade, the storage device may need to be restarted and/or shut down for a period of time, where that storage device becomes unavailable during that portion of the update process.

The challenge is to perform these upgrades to storage devices in a manner that minimizes the amount of downtime and data unavailability. With conventional approaches, all disks that are attached to a given server must be brought down to perform the firmware upgrade to the disks on that server. This causes a significant amount of data and devices to be rendered unavailable to the system.

Using the techniques described herein, a distributed management solution can be implemented to manage the upgrade process for storage devices in embodiments of the invention. The upgrades can be performed in a coordinated manner for multiple storage devices across an entire cluster, where only a certain designated number of devices are taken offline at any moment in time during the upgrade process. In addition, the upgrade process is performed in a manner that ensures continuing data availability.

As discussed previously, an election process can be performed to identify a master update module to manage the upgrade process. The master update module is responsible for managing the upgrade process for all other update modules in the networked environment. The master update module may maintain one or more tokens that it provides to other update modules in the networked environment to allow those update modules to complete installation of updated data for the storage devices in its corresponding node.

FIG. 7A is a flow diagram illustrating a method for performing storage device upgrades at a node in the networked environment from the perspective of the updating node. At 701, the data updates for a storage is downloaded to the respective nodes. Such update data may include updates, patches, or additional features to the storage device.

There may be any number of different types of storage devices in the environment, e.g., SSDs, HDDs, etc. In addition, each of these devices may be associated with different firmware versions. The action of 701 is to identify the specific devices to be upgraded, and to check for the current firmware version for the detected devices. If a given device is already at the most current firmware version, then it is not eligible for an upgrade. However, any device at an older firmware version may be subject to an upgrade. The new firmware data can then be distributed to the controller VMs at the respective nodes having storage devices that need to be upgraded. The download of the firmware updates can be performed concurrently on multiple nodes at the same time.

After the nodes in the networked environment that need a firmware update for its devices have acquired a copy of the update firmware data, a rolling update of the storage devices may begin. Upgrades to the storage devices may be performed in two steps, where the first step is to install the update firmware data and the second step is to actually perform the upgrade to the storage devices. The first installation step may be performed without requiring the storage device to shut down or restart. The second installation step requires the storage device to shut down or restart, potentially resulting in unavailability of data residing on that device during the installation step.

At 703, the firmware update data is installed on each node and preparations are made at this time to actually perform the upgrade. Upon downloading the update data, the update module for the node stores the firmware update data at a designated storage location on the node. Preparations are also made at this point to perform the upgrade. One or more storage-related factors may also be checked to see if the next portion of the update process can be completed. Any item of data that needs to be replicated to another device or node to meet replication requirements can be replicated at this point. It is noted that these action are performed at the node and includes portions of the installation process that do not require the node to shut down or be restarted. All nodes (including the node at which the master update module resides) in the networked virtualization environment for storage management may perform these portions of the installation process in parallel. Because this portion of the installation process does not require device/node shutdown or restart, it may be performed without first being granted approval by the master update module.

A determination is made at 705 as to whether the current status of the node is acceptable for the upgrade. For example, the update module may check the appropriate metadata to identify the current replication status of data stored at the device, and to see if the current number of copies of that data that is available within the networked environment is acceptable. An additional check can be made as to whether there have been any disk/device failures in the course of the upgrade process.

If the current status is unacceptable for upgrade, then the process returns back to 703 to take any actions that are necessary before upgrade can be performed. Alternatively, an exception can be issued, either immediately or after a designated time-out or retry period has elapsed.

If the update module determines that the current status is acceptable, then the update module at that node requests approval to perform the upgrade at 707. The request is made for approval to perform the portion of the installation that requires the device/node to be shut down or restarted such that the device/node itself, or any data local to the device/node, may be unavailable during that portion of the installation process.

In requesting approval to complete installation of the update data, the requesting update module may attempt to acquire a token from the master update module for completing installation of the firmware update data. The master update module may have one or more tokens which it grants to nodes within the networked environment for ensuring that only a prescribed number of devices/nodes are being shut down or restarted at a time to complete the installation process. Only a limited number of tokens are available, to minimize or eliminate the possibility of an excessive number of devices/nodes being unavailable or of data residing at a device/node undergoing restart/shutdown being unavailable.

If the master update module determines that it has one or more tokens available, it will grant the requesting update module the token. Otherwise, if the master update module determines that it does not have any tokens available, it will deny the requesting update modules request. The requesting update module makes a determination as to whether its request to complete installation of the update data is granted as shown at 709. If the request is denied, then the method returns to 707, where the update module again requests approval from the master update module to complete installation of the firmware update data. This process continues until the update module receives approval to the complete installation of the firmware update data from the master update module.

If the request is granted, then the requesting update module completes installation of the update data as shown at 711. Completing installation of the update data may involve shutting down or restarting the device and/or node at which the requesting update module resides. After the device has restarted, the update module finalizes the upgrade of the device. On the device itself, the upgrade may be finalized by moving data items to/from to the device. In addition, any device-specific settings that need to be configured may also be performed at this time.

It is possible that a device failure may occur, such that storage device does not come back up after the upgrade. In this situation, the data that is on the device may need to be replicated to other devices/nodes in the system.

Figure 7B:
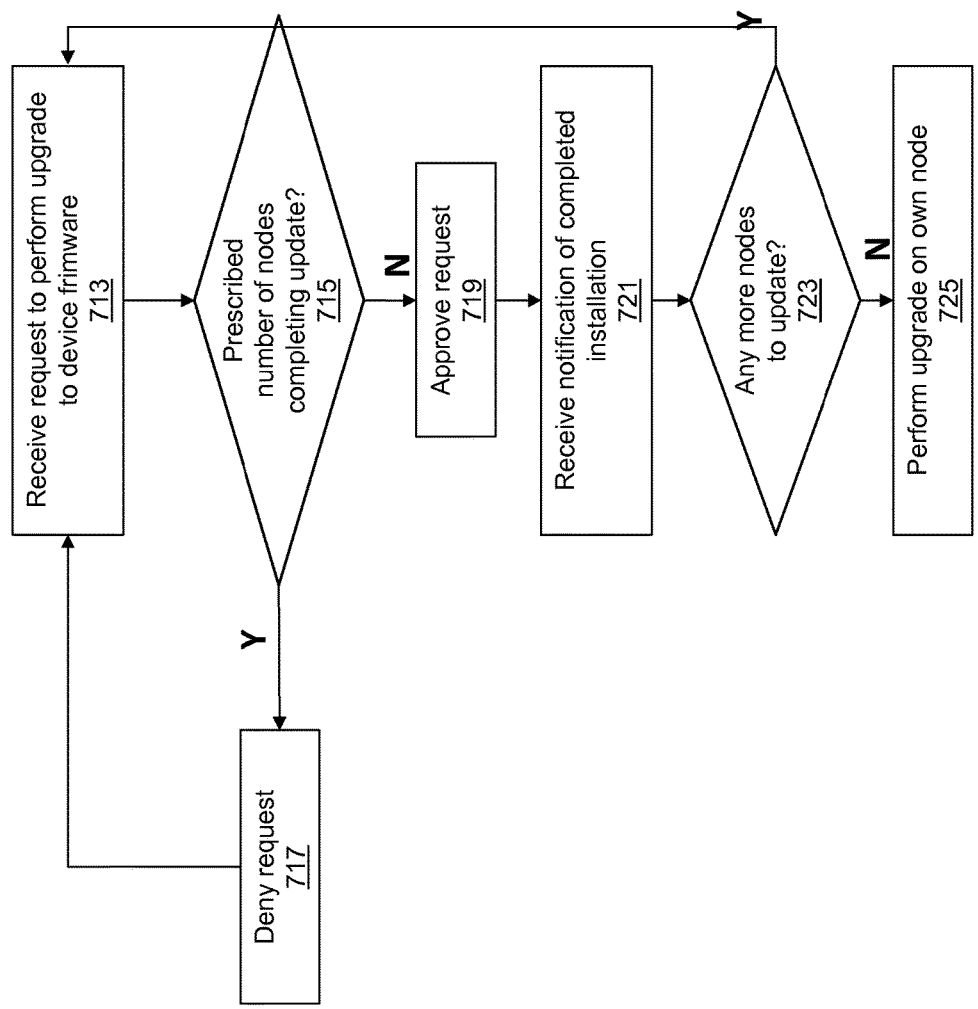
FIG. 7B is a flow diagram illustrating a method for upgrading a storage device from the perspective of a master update module.

FIG. 7B is a flow diagram illustrating a method for completing firmware upgrades for storage devices in the networked environment from the perspective of the master update module. Initially, the master update module receives a request for approval to complete installation of firmware update data from a node in the networked environment as shown at 713. When the master update module receives a request, it first makes a determination as to whether a prescribed number of nodes in the networked environment are currently completing installation of the firmware update data as shown at 715.

The master update module may make such a determination by identifying whether or not it has any tokens available. In the case of storage devices, this determination may be made at various levels of granularity. For example, this determination can be made on a cluster-wide basis to control within a cluster the number of devices that are rendered concurrently unavailable due to the upgrade process. The determination can also be made at other granularities, e.g., across multiple clusters.

If the master update module determines that it has no tokens available, then the prescribed number of devices/nodes in the networked environment currently completing installation of the firmware update data has been met and the networked environment is unable to tolerate any additional nodes completing installation of the update data at the current time. If, instead the master update module determines that it has one or more tokens available, then the prescribed number of devices/nodes in the networked environment currently completing installation of the firmware update data has not yet been met and the networked environment is currently able to tolerate additional devices/nodes completing installation of the firmware update data. Alternatively, where tokens are not used, the update module may consult its metadata or configuration data to identify the number of devices/nodes in the networked environment currently completing installation of the firmware update data and whether that number equals the prescribed number or falls below the prescribed number.

When the number of nodes in the networked virtualization environment currently completing upgrades to storage devices equals the prescribed number, the networked virtualization environment is unable to tolerate any additional nodes completing installation of the update data at the current time and the master update module denies the requesting node's request as shown at 717. The master update module then returns to 713 where it waits to receive another request from a node to complete installation of update data.

However, when the number of devices/nodes in the networked environment currently completing installation of the firmware update data falls below the prescribed number, the networked environment is able to currently tolerate the requesting node completing installation of the update data and the master update module may approve the request as shown at 719.

After granting approval to the requesting node, the master update module waits to receive a notification of the completion of installation of the firmware update data from the requesting node. In some embodiments, the master update module may simply wait to receive the token back from the requesting node after it completes installation of the update data. In other embodiments, the master update module may consult its metadata or configuration data to determine whether or not the requesting node has completed installation of the update data.

After receiving notification of the completion of installation of the update data from the requesting node as shown at 721, the master update module determines whether or not any additional nodes in the networked virtualization environment need to complete installation of firmware update data as shown at 723. The master update module may determine whether or not any additional nodes other than its own corresponding node need to complete installation of the firmware update data. If the master update module determines that there are additional nodes that need to complete installation of the update data, then it returns to 713, where it waits to receive another request to complete installation for update data from another node.

If the master update module instead determines that there are no additional devices/nodes that need to complete installation of the firmware update data, then it completes installation as shown at 725. In order for the master update module to complete installation of the update data at its own node, there must be another leadership election to elect a new master update module.

Coordinated Management of Multiple Upgrades Types

As described above, the invention is applicable to efficiently perform upgrades to any type of component or resource in the system. However, different approaches can taken to the management of the upgrade process when multiple types of upgrades are to be performed.

One possible approach is to manage each type of upgrade independently from the other upgrades. One way to implement this approach is to have separate sets of upgrade tokens for each type of upgrade. For example, if the system performs three types of upgrades (e.g., for (a) controller VMs (b) hypervisors; and (c) storage devices), then there would be a separate set of tokens for each type of upgrade. Therefore, the system sets up a first set of tokens to handle upgrade requests for controller VMs, a second set of tokens to handle upgrade requests for hypervisors, and a third set of tokens to handle upgrade requests for storage devices. The tokens for each set of tokens would be assigned independently of the other sets of tokens.

In some embodiments, multiple tokens may be granted to the same type of upgrade. For example, n tokens may be granted to permit multiple upgrades to occur in parallel. This may be implemented, for example, where n is based on "failure domains" to determine how many nodes can be upgraded in parallel. A failure domain pertains to a common failure attribute that may apply to multiple nodes, e.g., if two nodes are linked to a common power or network point-of-failure, then they can be considered to be within the same failure domain—where it is common to place a primary storage unit and its backup storage unit on separate failure domains. Here, the number n of nodes that can be upgraded in parallel is determined by the nodes to be upgraded that exist in the same, or different, failure domains.

Another possible approach is to perform coordinated management of the different types of upgrades. In this approach, the upgrade requests for any particular type of upgrade may be subject to considerations of the other types of upgrades.

To illustrate one scenario where it may be advantageous to perform coordinated management, consider if a node in the distributed system is subject to upgrades for both its controller VM and to its hypervisor. If both types of upgrades are managed independently, then it is possible that the approval process to perform these upgrades may result in the node obtaining approval at time T1 to perform the first upgrade, and then obtaining approval at a later time T3 to perform the second upgrade. The problem with this approach is that this results in two different periods of downtime to perform the two upgrades. Moreover, some of the preparation work and verification checked (e.g., to verify that data items meet replication factor requirements) may have to be duplicated for each of the upgrades. In this scenario, it may be far more efficient to perform both upgrades at the same time, so that the downtime is limited to a single upgrade time period. This approach would also reduce the amount of duplicated preparations, verifications, and post-upgrade operations that may need to be performed.

Figure 8:
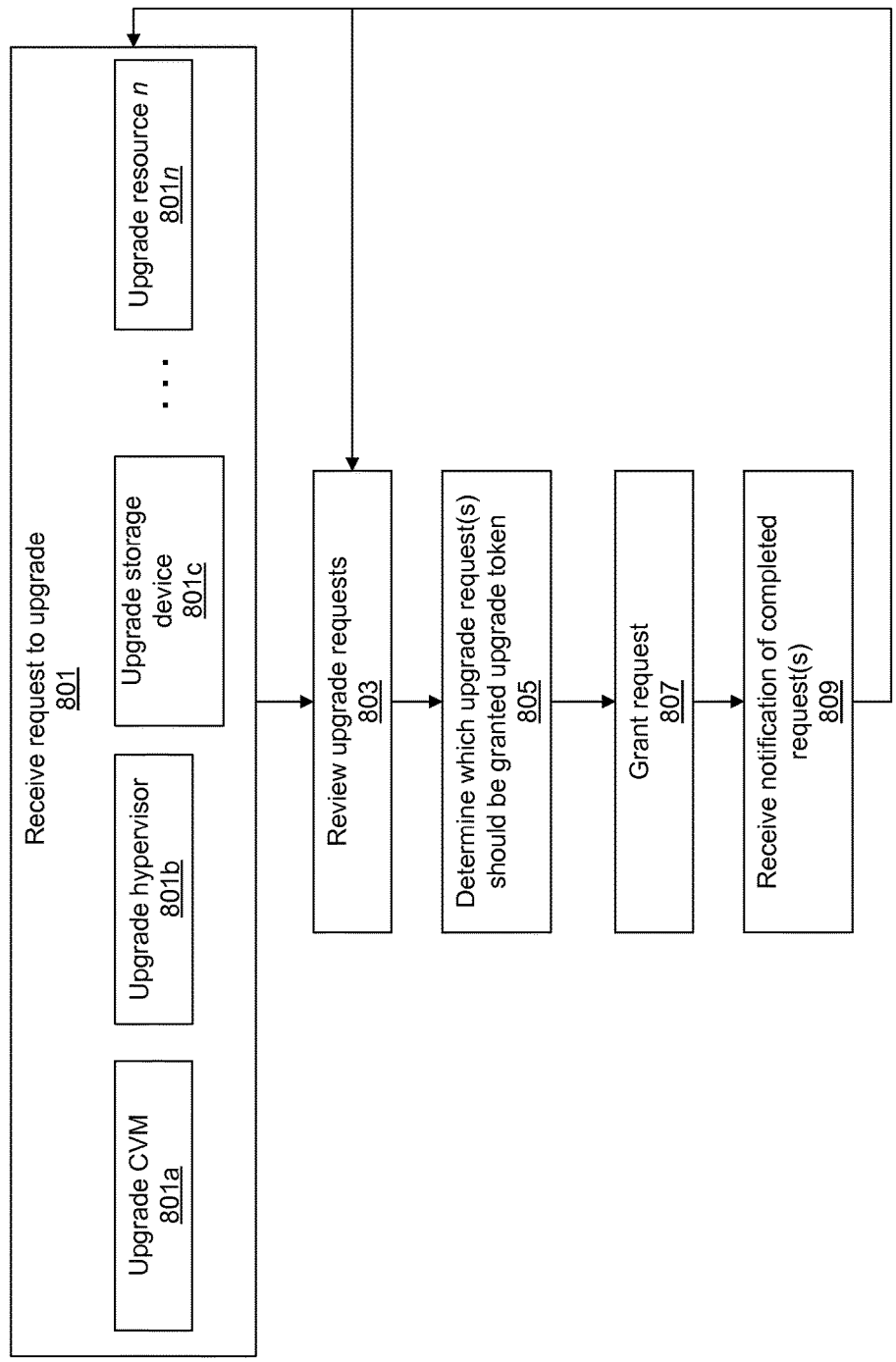
FIG. 8 is a flow diagram of a method for performing integrated upgrades for multiple types of resource upgrades.

FIG. 8 shows a process diagram of an approach to perform coordinated management of multiple types of rolling upgrades. At 801, a request is received to perform an upgrade. The request may pertain to any type of upgrade that can be handled by the distributed management system. For example, the request may be any one of a request 801a to upgrade a controller VM, a request 801b to upgrade a hypervisor, a request 801c to upgrade a storage device, or a request 801n to upgrade resource n in the system.

At 803, the upgrade request is reviewed in the distributed management system. The request is not reviewed in isolation, but is reviewed in an integrated manner such that it is reviewed in coordination with a review of other types of requests in the system.

At 805, a determination is made of the upgrade request(s) that should be granted. This determination is based upon the coordinated review of the various upgrade requests that are pending, as well as the understanding that various upgrades to be performed in the distributed system. The metadata maintained by the distributed management system can be reviewed to identify the different types of upgrades to be performed in the system. In addition, the metadata may also identify which of the nodes/devices are subject to upgrades. As a result, it is possible to understand which of the nodes/devices are subject to multiple upgrades, whether there are any dependencies that needs to be considered between the nodes/devices and the different types of upgrades, and the urgency at which the upgrades need to be performed.

If a given node is to be the subject of multiple upgrades, then one possible consideration is to determine the timing of the upgrades such that the multiple upgrades can be performed at the same time. This approach would therefore only grant the request to perform the upgrade when the node is ready to perform all of the upgrades, e.g., download and installation has been performed for all of the relevant update data the node is now requesting upgrades for all of the different upgrades.

It is possible that there is some urgency such that a given upgrade cannot be delayed until multiple other upgrades are ready to be performed for that same node. For example, there may be certain type of security upgrades that need to be performed immediately. Therefore, in this circumstance, the upgrade request or the security upgrade may be granted immediately, without requiring a wait time for other upgrades on the same node to be ready.

As is evident, the process to determine which upgrade request to grant may establish an ordering and sequence to the upgrades that are performed in the system. In some cases, the earlier upgrade request may be delayed, e.g., until other upgrades for the same node is ready to be processed. In other cases, the request from later in time may be granted earlier than other requests, e.g., to perform urgent security upgrades. The sequence of the upgrade requests may be established between and across considerations of upgrade types. Thus, even the same type of upgrade may be ordered based upon the specific upgrade to be performed (e.g., two separate patches that need to be implemented for the same hypervisor may have the later upgrade performed earlier in time if it is deemed to be most urgent). As is evident, different types of upgrades may also be considered in coordinated manner for the order in which upgrade requests are granted (e.g., a request to upgrade a controller VM and a request to upgrade a hypervisor are both considered in a coordinated manner to determine which should be granted first).

The determination of which upgrade request to grant may also factor in other considerations as well. For example, system workloads can also be considered such that upgrade requests that involve downtime for nodes will involve analysis of how upgrade requests are granted to minimize disruptions in service (e.g., grant upgrade request to nodes that are currently handling relatively less workloads and delay upgrade requests for nodes that are currently involved in high workloads). In addition, the order of upgrade requests can be configured to spread the upgrade burden across multiple controllers, so that any particular controller is not overburdened at any moment in time.

The type and quality of the data on the nodes may also factor into the decision to grant the upgrade requests. For example, certain of the upgrades may not correspond to node inter-dependencies (e.g., because of data replication), and may therefore be upgraded in parallel.

At 807, the upgrade request may be granted to one or more nodes/devices. In the present embodiment, this grant of the request is achieved by providing an upgrade token to the node/device. When multiple types of upgrades are handled in a coordinated manner, then the token is global across the multiple upgrade workflow types. In some embodiments, the nodes themselves will perform the task of making sure that its upgrade status is acceptable (e.g., making sure replication factors are acceptable for data on the node to be upgraded). In other embodiments, the master controller will perform this task of checking and verification.

In some embodiments, the upgrade status is checked for acceptability according to one or more storage properties of storage devices and/or data on the storage devices. For example, replication factors can be checked to determine whether they are acceptable for data on the node to be upgraded. As another example, the failure domain of the node can be checked for the upgrade status acceptability. As noted above, a failure domain pertains to a common failure attribute that may apply to multiple nodes. The failure domain of the nodes to be upgraded can be checked to make sure that satisfactory storage properties are met for the upgrade status (e.g., to check whether the nodes to be upgraded are within the same failure domain). Another storage property that can be checked pertain to type of disk/storage for the storage unit being upgraded (e.g., whether SSD or hard disk drives are to be upgraded).

The nodes that have been granted permission will go ahead and perform the approved upgrade(s). Once the upgrades have been completed, then at 809, a notification is received at the master controller. At this point, the tokens are available to be re-assigned to others. The process then returns back to 803 to review other upgrade requests. In addition, new upgrade requests may have been received at 801 in the interim that need to be considered.

While a multi-step approach has been described above for installation of update data, it is noted that even a one-step operation falls within the scope of certain embodiments of the invention. For example, an inventive concept that was described herein concerns distributed upgrades handled by the master that may be performed either with one step or multiple (e.g., two) steps.

Therefore, what has been disclosed is an improved mechanism for performing rolling updates in a networked virtualization environment. The approach is applicable to any resource in the system, including controller VMs, hypervisors, and storage devices. Integrated processing may be performed across multiple types of upgrades.

System Architecture

Figure 9:
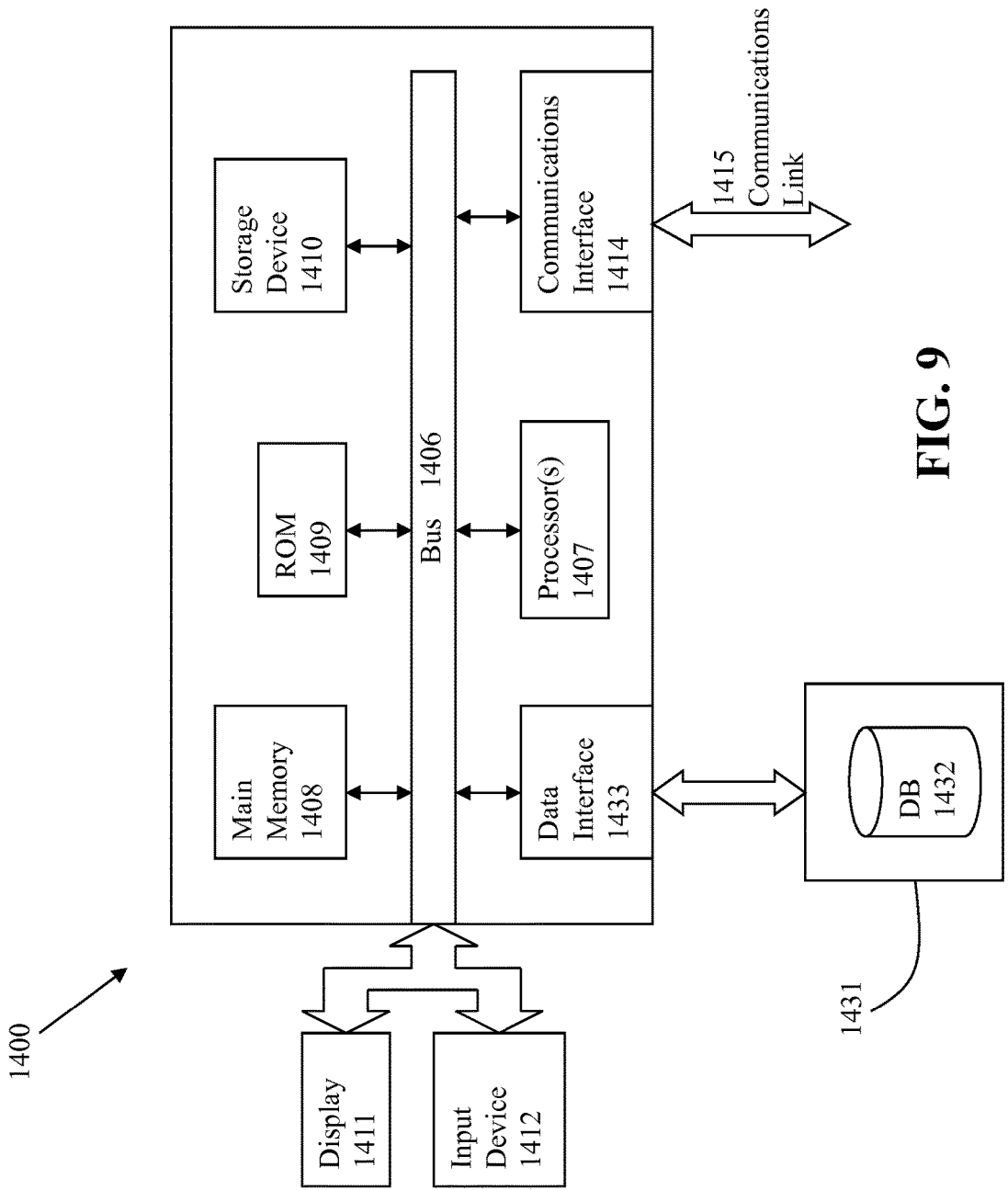
FIG. 9 is a block diagram of an illustrative computing system suitable for implementing an embodiment of the present invention

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 may be implemented using storage medium 1431 that is accessible thorough data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for performing rolling updates in a cluster of nodes, comprising:

performing a leadership election to elect any node from among the cluster of nodes as a master, the cluster of nodes comprising multiple storage controllers distributed across the cluster of nodes, the cluster of nodes being implemented as a networked virtualization environment, the multiple storage controllers being implemented as controller virtual machines to manage access by the cluster of nodes to a global storage pool comprising a plurality of storage devices distributed across the cluster of nodes, the global storage pool having a first local storage on a first node from amongst the cluster of nodes and a second local storage on a second node from amongst the cluster of nodes, wherein any storage controllers distributed across the cluster of nodes utilize controller virtual machines to read and write to the plurality of storage devices in the global storage pool;

acquiring update data by some or all of the cluster of nodes, wherein update data information is stored in any local storage on a node from amongst the cluster of nodes accessible by any storage controllers within the networked virtualization environment, including the master, to identify an existence of update data to all nodes;

determining whether an upgrade status at a node is acceptable by the master or by individual nodes in the cluster of nodes; and granting approval to complete installation of the update data at the node by the master when the upgrade status at the node is acceptable.

2. The method of claim 1, wherein the update data comprises a hypervisor upgrade.

3. The method of claim 1, wherein the update data comprises an upgrade to a storage device from the plurality of storage devices distributed across the cluster of nodes.

4. The method of claim 1, wherein the update data comprises an upgrade to one or more of the controller virtual machines.

5. The method of claim 1, wherein the update data corresponds to multiple types of components in a networked virtualization environment to be upgraded, and coordinated management is performed for the installation of the update data for the multiple types of components.

6. The method of claim 1, wherein acquiring update data comprises:

receiving the update data at a first node from the cluster of nodes;

updating configuration data of the first node to indicate, to the cluster of nodes, existence of the update data;

recognizing, by one or more other nodes from the cluster of nodes, the existence of the update data, the one or more other nodes being different from the first node; and acquiring the update data by the one or more other nodes.

7. The method of claim 1, wherein a storage property is reviewed to determine that the upgrade status is acceptable.

8. The method of claim 7, wherein the storage property corresponds to at least one of a replication status, failure domain, or storage type.

9. The method of claim 8, wherein the master determines whether the storage property of the node is acceptable by checking metadata distributed across the cluster of nodes.

10. The method of claim 8, wherein the replication status of the node is acceptable when a current replication factor for data at the node meets a desired replication factor or when failure of the node is supportable.

11. The method of claim 8, wherein the global storage pool further comprises a plurality of local storage devices that are within or attached to their respective nodes from among the cluster of nodes such that the local storage devices are managed as part of the global storage pool and at least a networked storage device.

12. The method of claim 1, wherein the individual nodes determine whether the upgrade status is acceptable by checking metadata distributed across the cluster of nodes.

13. The method of claim 1, wherein granting approval to complete installation of the update data at the node by the master comprises providing a token to the node for completing installation.

14. The method of claim 13, wherein multiple tokens are concurrently granted.

15. The method of claim 14, wherein the multiple tokens are granted for different types of upgrades.

16. The method of claim 14, wherein the multiple tokens are granted for same types of upgrades, and a storage property is checked to determine whether the multiple tokens are to be granted.

17. The method of claim 16, wherein the multiple tokens are granted in consideration of failure domains.

18. The method of claim 1, wherein completing installation of the update data at a node at which the master resides causes another leadership election process to be performed.

19. The method of claim 1, wherein failure of the master causes another leadership election process to be performed.

20. The method of claim 1, wherein completing installation of the update data at the node requires data residing at the node to be unavailable for a period of time.

21. A computer program product embodied on a non-transitory computer readable medium, the non-transitory computer readable medium having stored thereon a sequence of instructions which, when executed by a processor causes the processor to execute a method for performing rolling updates in a networked virtualization environment, comprising:

performing a leadership election to elect any node from among the cluster of nodes as a master, the cluster of nodes comprising multiple storage controllers distributed across the cluster of nodes, the cluster of nodes being implemented as a networked virtualization environment, the multiple storage controllers being implemented as controller virtual machines to manage access by the cluster of nodes to a global storage pool comprising a plurality of storage devices distributed across the cluster of nodes, the global storage pool having a first local storage on a first node from amongst the cluster of nodes and a second local storage on a second node from amongst the cluster of nodes, wherein any storage controllers distributed across the cluster of nodes utilize controller virtual machines to read and write to the plurality of storage devices in the global storage pool;

acquiring update data by some or all of the cluster of nodes, wherein update data information is stored in any local storage on a node from amongst the cluster of nodes accessible by any storage controllers within the networked virtualization environment, including the master, to identify an existence of update data to all nodes;

determining whether an upgrade status at a node is acceptable by the master or by individual nodes in the cluster of nodes; and granting approval to complete installation of the update data at the node by the master when the upgrade status at the node is acceptable.

22. The computer program product of claim 21, wherein the update data comprises a hypervisor upgrade.

23. The computer program product of claim 21, wherein the update data comprises an upgrade to a storage device from the plurality of storage devices distributed across the cluster of nodes.

24. The computer program product of claim 21, wherein the update data comprises an upgrade to one or more of the controller virtual machines.

25. The computer program product of claim 21, wherein the update data corresponds to multiple types of components in a networked virtualization environment to be upgraded, and coordinated management is performed for the installation of the update data for the multiple types of components.

26. The computer program product of claim 21, wherein acquiring update data comprises:

receiving the update data at a first node from the cluster of nodes;

updating configuration data of the first node to indicate, to the cluster of nodes, existence of the update data;

recognizing, by one or more other nodes from the cluster of nodes, the existence of the update data, the one or more other nodes being different from the first node; and acquiring the update data by the one or more other nodes.

27. The computer program product of claim 21, wherein a storage property is reviewed to determine that the upgrade status is acceptable.

28. The computer program product of claim 27, wherein the storage property corresponds to at least one of a replication status, failure domain, or storage type.

29. The computer program product of claim 28, wherein the master determines whether the storage property of the node is acceptable by checking metadata distributed across the cluster of nodes.

30. The computer program product of claim 28, wherein the replication status of the node is acceptable when a current replication factor for data at the node meets a desired replication factor or when failure of the node is supportable.

31. The computer program product of claim 28, wherein the global storage pool further comprises a plurality of local storage devices that are within or attached to their respective nodes from among the cluster of nodes such that the local storage devices are managed as part of the global storage pool and at least a networked storage device.

32. The computer program product of claim 21, wherein the individual nodes determine whether the upgrade status is acceptable by checking metadata distributed across the cluster of nodes.

33. The computer program product of claim 21, wherein granting approval to complete installation of the update data at the node by the master comprises providing a token to the node for completing installation.

34. The computer program product of claim 33, wherein multiple tokens are concurrently granted.

35. The computer program product of claim 34, wherein the multiple tokens are granted for different types of upgrades.

36. The computer program product of claim 34, wherein the multiple tokens are granted for same types of upgrades, and a storage property is checked to determine whether the multiple tokens are to be granted.

37. The computer program product of claim 36, wherein the multiple tokens are granted in consideration of failure domains.

38. The computer program product of claim 21, wherein completing installation of the update data at a node at which the master resides causes another leadership election process to be performed.

39. The computer program product of claim 21, wherein failure of the master causes another leadership election process to be performed.

40. The computer program product of claim 21, wherein completing installation of the update data at the node requires data residing at the node to be unavailable for a period of time.

41. A system for performing rolling updates in a networked virtualization environment, comprising:
a computer processor to execute a set of program code instructions;
a memory to hold the set of program code instructions, in which the set of program code instructions comprises program code to perform:
performing a leadership election to elect any node from among a cluster of nodes as a master, the cluster of nodes comprising multiple storage controllers distributed across the cluster of nodes, the cluster of nodes being implemented as a networked virtualization environment, the multiple storage controllers being implemented as controller virtual machines to manage access by the cluster of nodes to a global storage pool comprising a plurality of storage devices distributed across the cluster of nodes, the global storage pool having a first local storage on a first node from amongst the cluster of nodes and a second local storage on a second node from amongst the cluster of nodes, wherein any storage controllers distributed across the cluster of nodes utilize controller virtual machines to read and write to the plurality of storage devices in the global storage pool;
acquiring update data by some or all of the cluster of nodes, wherein update data information is stored in any local storage on a node from amongst the cluster of nodes accessible by any storage controllers within the networked virtualization environment, including the master, to identify an existence of update data to all nodes;
determining whether an upgrade status at a node is acceptable by the master or by individual nodes in the cluster of nodes; and
granting approval to complete installation of the update data at the node by the master when the upgrade status at the node is acceptable.

42. The system of claim 41, wherein the update data comprises a hypervisor upgrade.

43. The system of claim 41, wherein the update data comprises an upgrade to a storage device from the plurality of storage devices distributed across the cluster of nodes.

44. The system of claim 41, wherein the update data comprises an upgrade to one or more of the controller virtual machines.

45. The system of claim 41, wherein the update data corresponds to multiple types of components in a networked virtualization environment to be upgraded, and coordinated management is performed for the installation of the update data for the multiple types of components.

46. The system of claim 41, wherein completing installation of the update data at the node requires data residing at the node to be unavailable for a period of time.

47. The system of claim 41, wherein a storage property is reviewed to determine that the upgrade status is acceptable.

48. The system of claim 47, wherein the storage property corresponds to at least one of a replication status, failure domain, or storage type.

49. The system of claim 48, wherein the master determines whether the storage property of the node is acceptable by checking metadata distributed across the cluster of nodes.

50. The system of claim 48, wherein the replication status of the node is acceptable when a current replication factor for data at the node meets a desired replication factor or when failure of the node is supportable.

51. The system of claim 48, wherein the global storage pool further comprises a plurality of local storage devices that are within or attached to their respective nodes from among the cluster of nodes such that the local storage devices are managed as part of the global storage pool and at least a networked storage device.

52. The system of claim 41, wherein the individual nodes determine whether the upgrade status is acceptable by checking metadata distributed across the cluster of nodes.

53. The system of claim 41, wherein granting approval to complete installation of the update data at the node by the master comprises providing a token to the node for completing installation.

54. The system of claim 53, wherein multiple tokens are concurrently granted.

55. The system of claim 54, wherein the multiple tokens are granted for different types of upgrades.

56. The system of claim 54, wherein the multiple tokens are granted for same types of upgrades, and a storage property is checked to determine whether the multiple tokens are to be granted.

57. The system of claim 56, wherein the multiple tokens are granted in consideration of failure domains.

58. The system of claim 41, wherein completing installation of the update data at a node at which the master resides causes another leadership election process to be performed.

59. The system of claim 41, wherein failure of the master causes another leadership election process to be performed.

* * * * *